US012663915B2

(12) United States Patent
De Vries et al.

(10) Patent No.: US 12,663,915 B2
(45) Date of Patent: Jun. 23, 2026

(54) CONTENT ITEM SCRUBBING TECHNIQUES

(71) Applicant: Apple Inc., Cupertino, CA (US)

(72) Inventors: Nathan De Vries, San Francisco, CA (US); Chanaka G. Karunamuni, San Jose, CA (US)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 18/329,224

(22) Filed: Jun. 5, 2023

(65) Prior Publication Data

US 2023/0393720 A1 Dec. 7, 2023

Related U.S. Application Data

(60) Provisional application No. 63/365,870, filed on Jun. 5, 2022.

(51) Int. Cl.
 *G06F 3/04845* (2022.01)
 *G06F 3/04815* (2022.01)
 *G06F 3/0488* (2022.01)

(52) U.S. Cl.
 CPC ...... *G06F 3/04845* (2013.01); *G06F 3/04815* (2013.01); *G06F 3/0488* (2013.01)

(58) Field of Classification Search
 CPC ............. G06F 3/04845; G06F 3/04815; G06F 3/0488; G06F 3/0484; H04N 21/440281; H04N 21/47217
 See application file for complete search history.

(56) References Cited

U.S. PATENT DOCUMENTS

| | | | |
|---|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |

(Continued)

FOREIGN PATENT DOCUMENTS

| | | |
|---|---|---|
| WO | 2013169849 A2 | 11/2013 |
| WO | 2014105276 A1 | 7/2014 |

OTHER PUBLICATIONS

International Search Report received for PCT Patent Application No. PCT/US2023/024443, mailed on Sep. 26, 2023, 4 Pages.

*Primary Examiner* — Kenny Nguyen
(74) *Attorney, Agent, or Firm* — Kubota & Basol LLP

(57) ABSTRACT

In some embodiments, a content item scrubbing technique includes, while displaying a user interface including a content item, receiving, via one or more input devices, an input for scrubbing through the content item, wherein the input for scrubbing through the content item includes a first part directed to a region corresponding to a portion of the user interface that does not include a scrubber bar, and a second part including movement in the region, and in response to receiving the input for scrubbing through the content item, and in accordance with a determination that the input for scrubbing through the content item satisfies one or more first criteria, scrubbing through the content item in accordance with the movement in the region.

63 Claims, 20 Drawing Sheets

(56)  References Cited

U.S. PATENT DOCUMENTS

| | | | | |
|---|---|---|---|---|
| 7,956,847 | B2 * | 6/2011 | Christie | G11B 27/034 |
| | | | | 345/173 |
| 7,957,762 | B2 | 6/2011 | Herz et al. | |
| 8,006,002 | B2 | 8/2011 | Kalayjian et al. | |
| 8,239,784 | B2 | 8/2012 | Hotelling et al. | |
| 8,279,180 | B2 | 10/2012 | Hotelling et al. | |
| 8,381,135 | B2 | 2/2013 | Hotelling et al. | |
| 8,407,747 | B1 * | 3/2013 | Inskip | H04N 21/2393 |
| | | | | 725/90 |
| 8,479,122 | B2 | 7/2013 | Hotelling et al. | |
| 9,348,458 | B2 | 5/2016 | Hotelling et al. | |
| 9,588,647 | B1 * | 3/2017 | Lewis | G06F 3/04817 |
| 9,639,241 | B2 * | 5/2017 | Penha | G06F 3/0488 |
| 9,836,204 | B1 * | 12/2017 | Huang | G06F 3/04855 |
| 9,933,937 | B2 | 4/2018 | Lemay et al. | |
| 10,528,186 | B2 * | 1/2020 | Siddiq | H04N 21/4325 |
| 10,817,168 | B1 * | 10/2020 | Lewis | G06F 3/04883 |
| 10,983,688 | B2 * | 4/2021 | Lemay | G06F 3/0482 |
| 11,429,251 | B2 * | 8/2022 | Lewis | G06F 3/0482 |
| 11,997,413 | B2 * | 5/2024 | Post, Jr. | G06F 3/0481 |
| 12,160,641 | B1 * | 12/2024 | Su | H04N 21/47217 |
| 2002/0015024 | A1 | 2/2002 | Westerman et al. | |
| 2005/0190059 | A1 | 9/2005 | Wehrenberg | |
| 2006/0017692 | A1 | 1/2006 | Wehrenberg et al. | |
| 2006/0033724 | A1 | 2/2006 | Chaudhri et al. | |
| 2006/0197753 | A1 | 9/2006 | Hotelling | |
| 2009/0235193 | A1 * | 9/2009 | Bhatt | G06F 3/04847 |
| | | | | 715/765 |
| 2012/0070129 | A1 * | 3/2012 | Lin | G06F 40/103 |
| | | | | 386/278 |
| 2012/0151346 | A1 * | 6/2012 | McClements, IV | G11B 27/034 |
| | | | | 715/716 |
| 2016/0139794 | A1 * | 5/2016 | Hammendorp | G06F 3/0488 |
| | | | | 715/716 |
| 2016/0224233 | A1 * | 8/2016 | Phang | H04N 21/4828 |
| 2017/0285860 | A1 * | 10/2017 | Siddiq | G06F 3/045 |
| 2017/0357430 | A1 * | 12/2017 | Lemay | G11B 27/005 |
| 2018/0316962 | A1 * | 11/2018 | Prakash | G11B 27/34 |
| 2018/0364878 | A1 * | 12/2018 | Penha | G06F 3/04842 |
| 2020/0296317 | A1 * | 9/2020 | Post, Jr. | H04N 7/0122 |
| 2021/0041996 | A1 * | 2/2021 | Lewis | H04M 1/72403 |

* cited by examiner

450

468

470

453

451

460

462

Tactile Output
Generator(s) 357

Contact Intensity
Sensor(s) 359

452

700

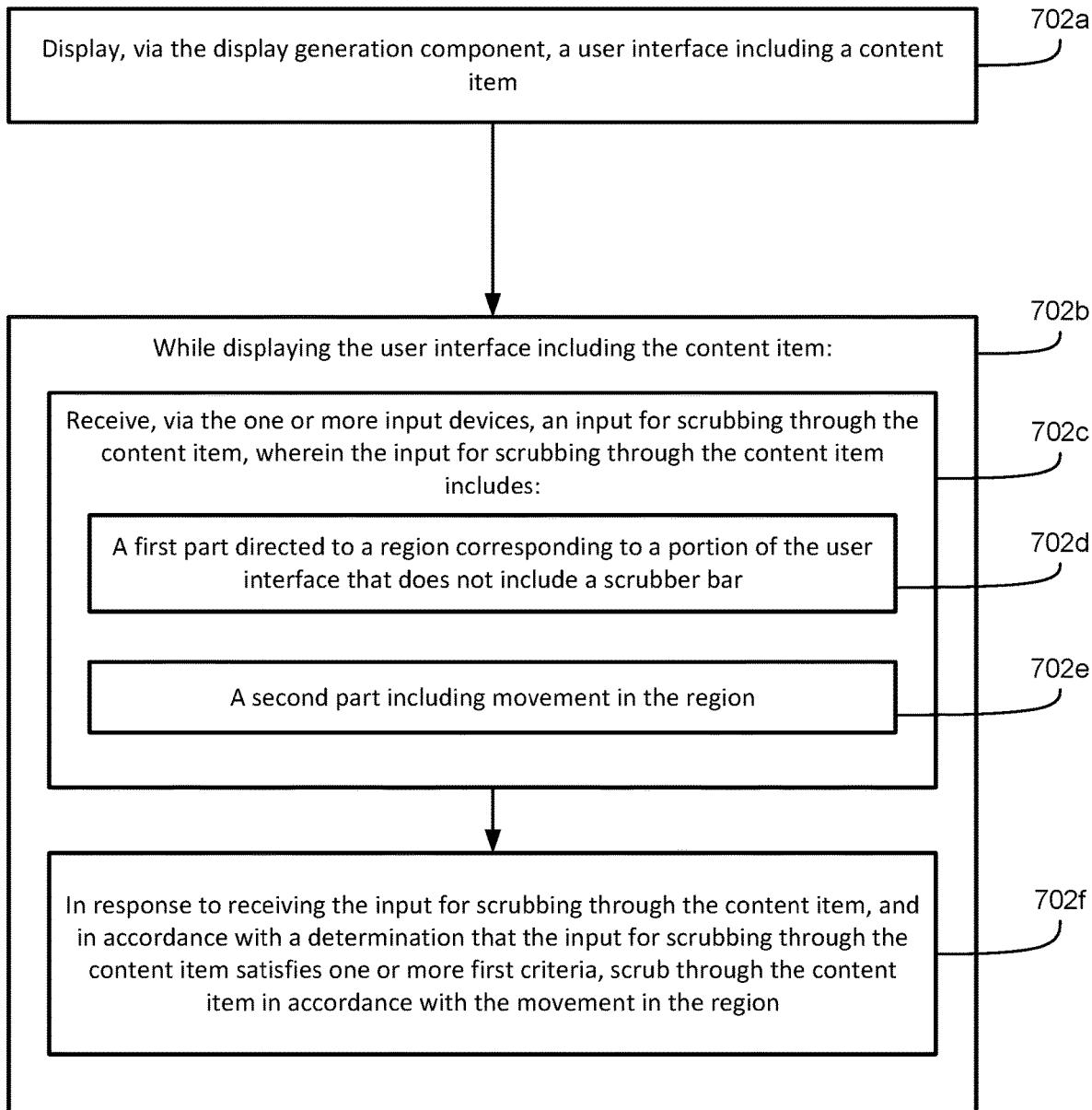

702a — Display, via the display generation component, a user interface including a content item 702b — While displaying the user interface including the content item:

702c — Receive, via the one or more input devices, an input for scrubbing through the content item, wherein the input for scrubbing through the content item includes:

702d — A first part directed to a region corresponding to a portion of the user interface that does not include a scrubber bar 702e — A second part including movement in the region 702f — In response to receiving the input for scrubbing through the content item, and in accordance with a determination that the input for scrubbing through the content item satisfies one or more first criteria, scrub through the content item in accordance with the movement in the region

*FIG. 7*

CONTENT ITEM SCRUBBING TECHNIQUES

CROSS-REFERENCE TO RELATED APPLICATIONS

This application claims the benefit of U.S. Provisional Application No. 63/365,870, filed Jun. 5, 2022, the content of which is incorporated herein by reference in its entirety for all purposes.

FIELD OF THE DISCLOSURE

This disclosure relates generally to scrubbing through content items displayed on a display.

BACKGROUND OF THE DISCLOSURE

User interaction with electronic devices has increased significantly in recent years. These devices can be devices such as computers, tablet computers, televisions, multimedia devices, or mobile devices. Sometimes, a user may wish to view a content item (e.g., video content) on the display.

SUMMARY OF THE DISCLOSURE

In some circumstances, while displaying a content item in playback on a user interface, an electronic device receives an input for scrubbing through the content item. In response to receiving the input for scrubbing through the content item, if the input satisfies one or more first criteria, the electronic device optionally scrubs through the content item. In some circumstances, the input for scrubbing includes touchdown of a touch contact in a region of the UI that does not include a scrubber bar, and movement of the contact while remaining outside of the scrubber bar. Scrubbing through a content item in accordance with movement of an input directed to a region corresponding to a portion of a user interface that does not include a scrubber bar reduces steps involved for a user to initiate scrubbing of the content item. In some circumstances, the input for scrubbing through the content item includes touchdown of a touch contact in a region of the UI that does include a scrubber bar.

The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 7 is a flow diagram illustrating a method for scrubbing a content item in accordance with some embodiments of the present disclosure.

DETAILED DESCRIPTION

Figure 1A:
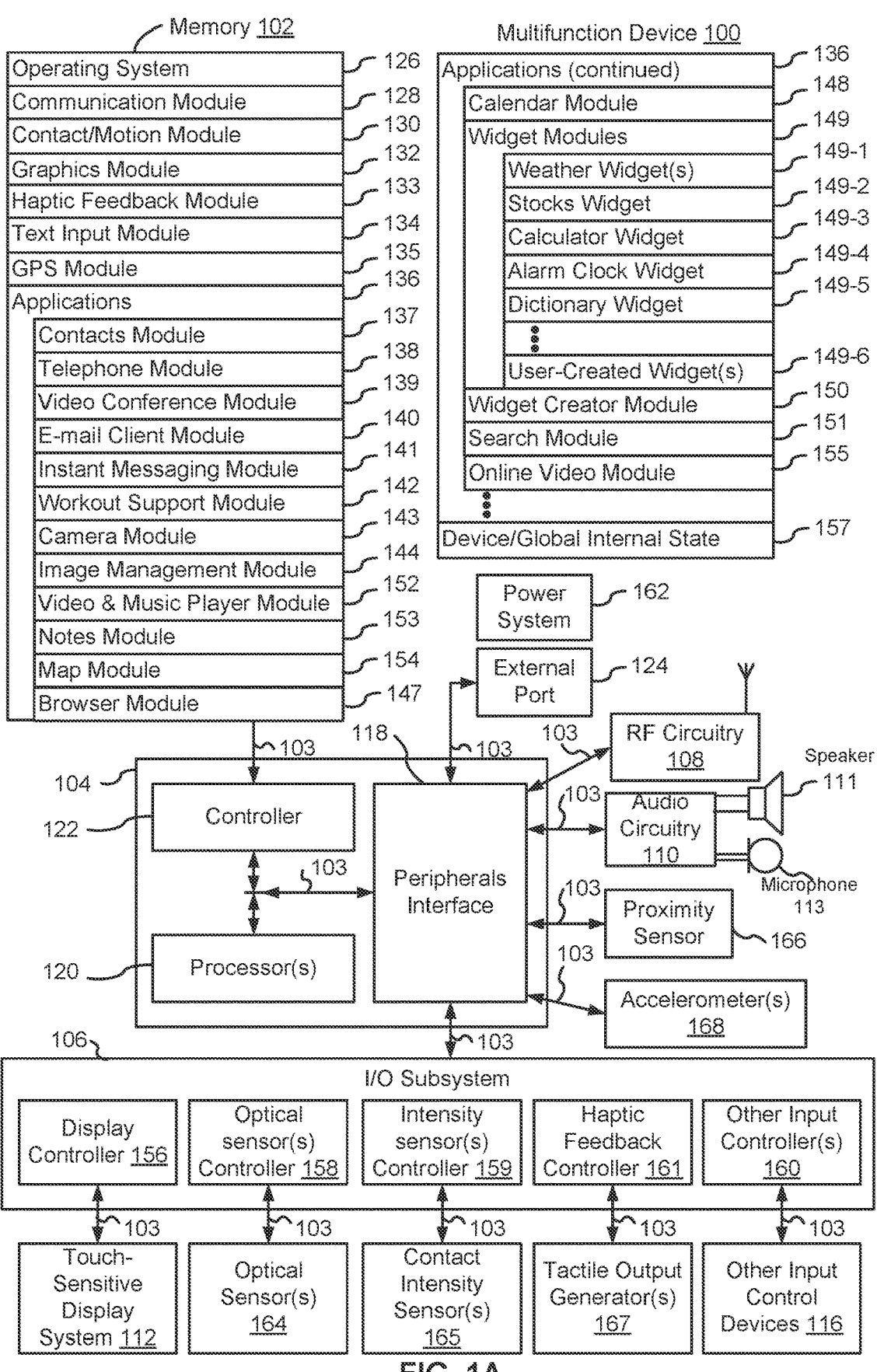
FIG. 1A is a block diagram illustrating a multifunction device with a touch-sensitive display in accordance with some embodiments of the present disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

Content item scrubbing techniques for scrubbing, skipping, and/or displaying content(s) of a content item are disclosed. In some implementations, a content item scrubbing technique includes scrubbing through a content item displayed on a display in response to a swipe input detected on a touch-sensitive surface. In some implementations, a content item scrubbing technique includes continuing scrubbing through a content item after liftoff of a swipe input detected on a touch-sensitive surface. In some implementations, a content item scrubbing technique includes visually animating scrubbing through the content item at the size of the content item that the content item had before scrubbing through the content item was initiated. In some implementations, the swipe input is received anywhere on a scrubber bar corresponding to a content item (e.g., not just at a current playback position indicator in the scrubber bar). In some implementations, a content item scrubbing technique maintains consistency of presentation of the content item before, during, and/or after scrubbing, thus reducing errors in usage.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/ to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
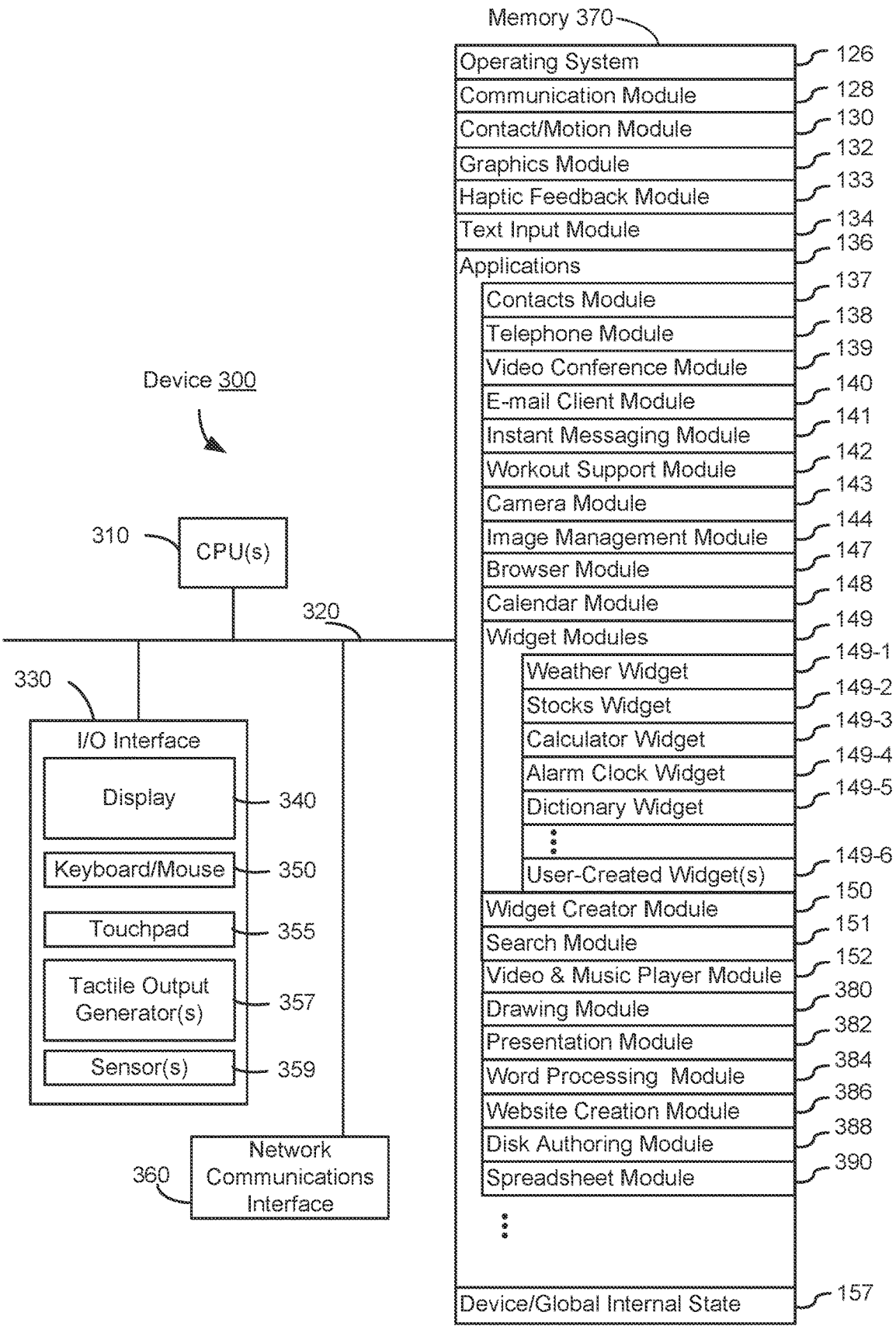
FIG. 3 is a block diagram of an exemplary multifunction device with a display and a touch-sensitive surface in accordance with some embodiments of the present disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);

telephone module 138;

video conferencing module 139;

e-mail client module 140;

instant messaging (IM) module 141;

workout support module 142;

camera module 143 for still and/or video images;

image management module 144;

video player module;

music player module;

browser module 147;

calendar module 148;

widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which merges video player module and music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
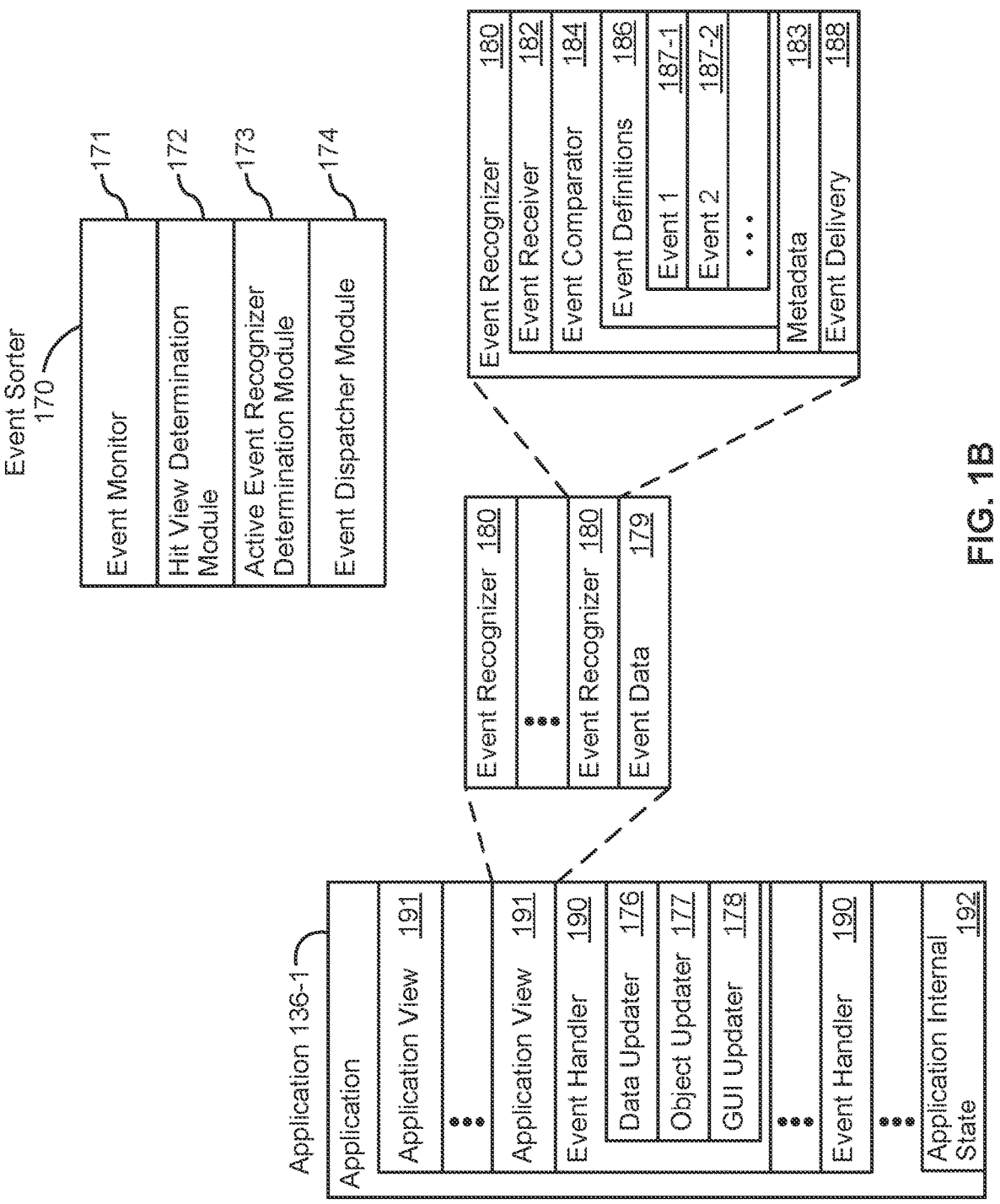
FIG. 1B is a block diagram illustrating exemplary components for event handling in accordance with some embodiments of the present disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from 110 subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
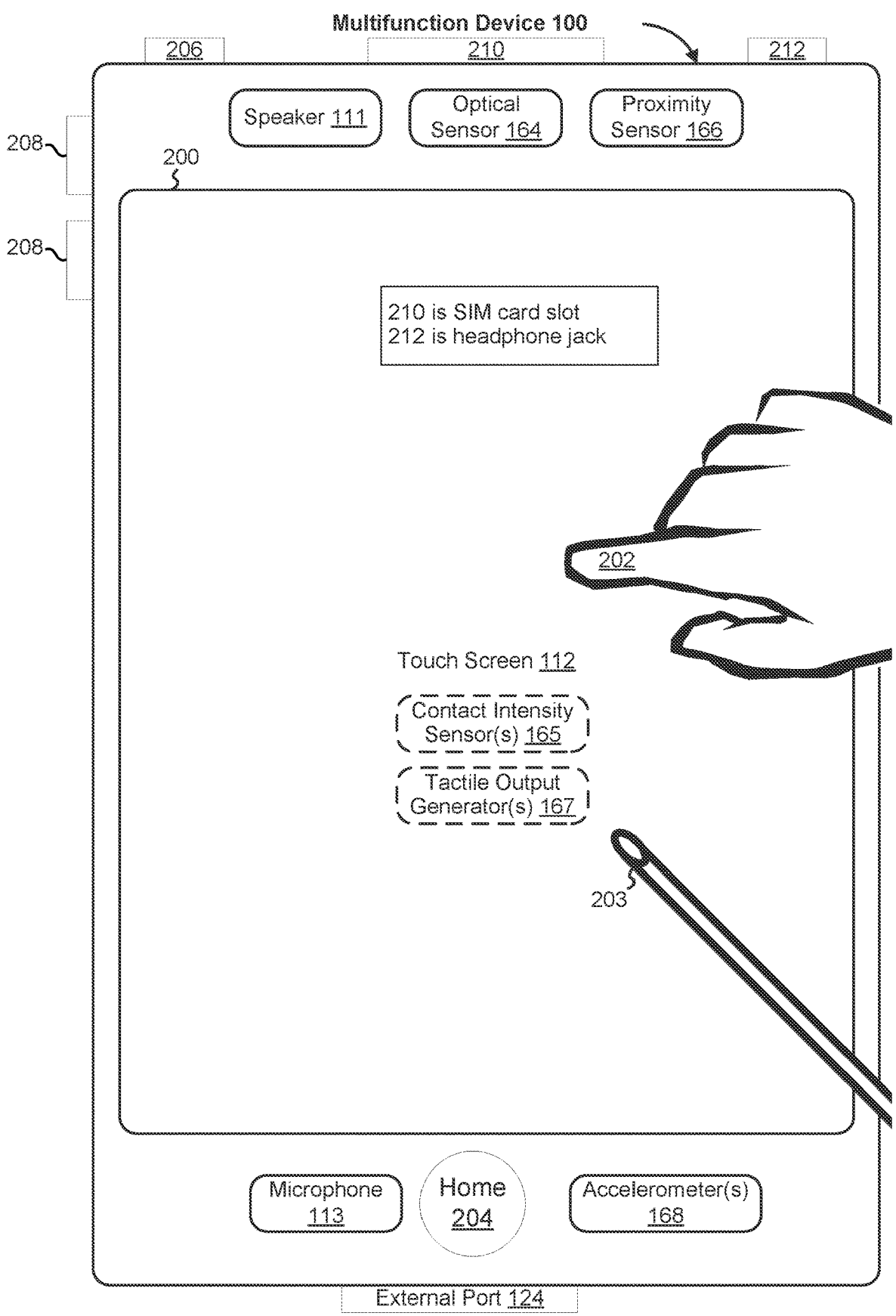
FIG. 2 illustrates a multifunction device having a touch screen in accordance with some embodiments of the present disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
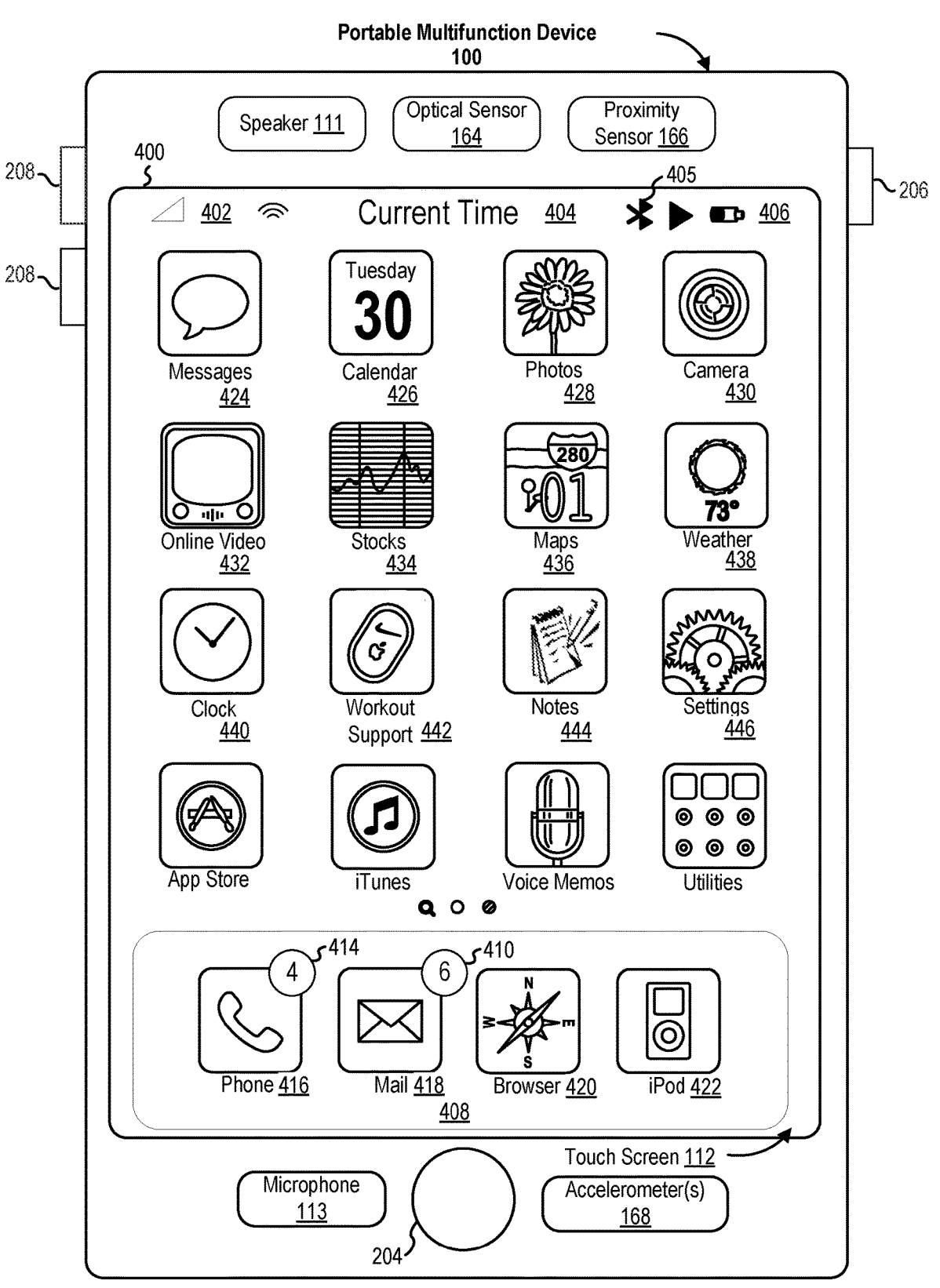
FIG. 4A illustrates an exemplary user interface for a menu of applications on a portable multifunction device in accordance with some embodiments of the present disclosure.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;"
   and Icon 422 for video and music player module 152,
   also referred to as iPod (trademark of Apple Inc.)
   module 152, labeled "iPod;" and Icons for other applications, such as:
   Icon 424 for IM module 141, labeled "Messages;"
   Icon 426 for calendar module 148, labeled "Calendar;"
   Icon 428 for image management module 144, labeled
     "Photos;"
   Icon 430 for camera module 143, labeled "Camera;"
   Icon 432 for online video module 155, labeled "Online
     Video;"
   Icon 434 for stocks widget 149-2, labeled "Stocks;"
   Icon 436 for map module 154, labeled "Maps;"
   Icon 438 for weather widget 149-1, labeled "Weather;"
   Icon 440 for alarm clock widget 149-4, labeled
     "Clock;"
   Icon 442 for workout support module 142, labeled
     "Workout Support;"
   Icon 444 for notes module 153, labeled "Notes;" and
   Icon 446 for a settings application or module, labeled
     "Settings," which provides access to settings for
     device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
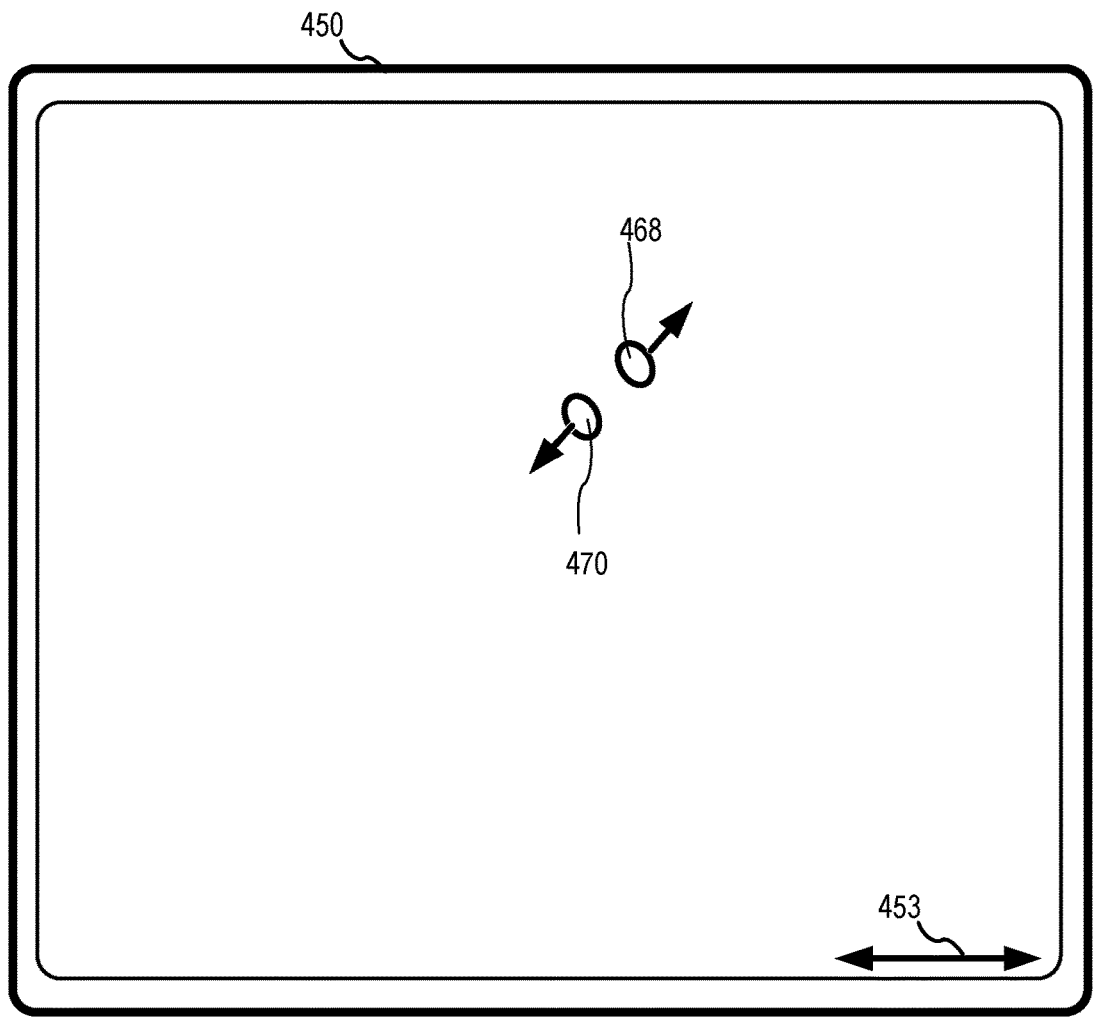
FIG. 4B illustrates an exemplary user interface for a multifunction device with a touch-sensitive surface that is separate from the display in accordance with some embodiments of the present disclosure.
Figure 4B:
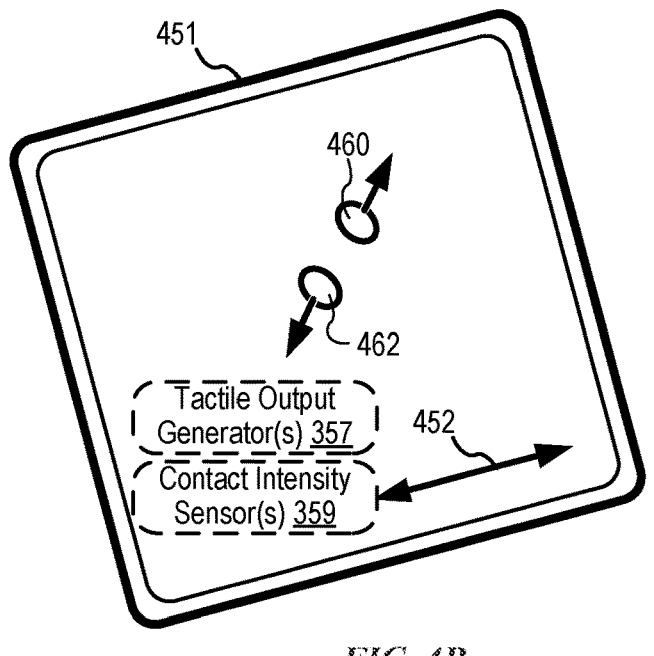

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
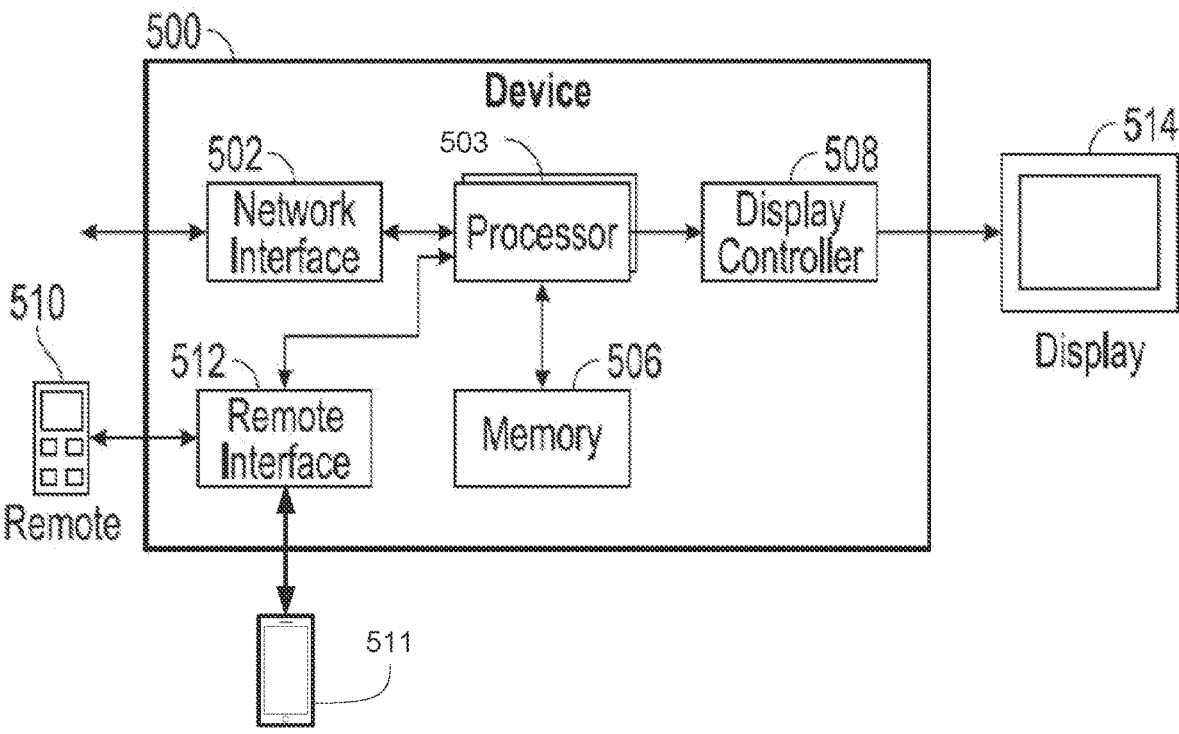
FIGS. 5A-5C illustrate block diagrams of exemplary architectures for devices in accordance with some embodiments of the present disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 503 optionally execute any number of programs stored in memory 506 or storage, which optionally includes instructions to perform one or more of the methods and/or processes described herein (e.g., method 700). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIGS. 5, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 503 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4B; and, display 514 optionally corresponds to one or more of touch-sensitive display system 112 in FIGS. 1A and 2, and display 340 in FIG. 3.

Figure 5B:
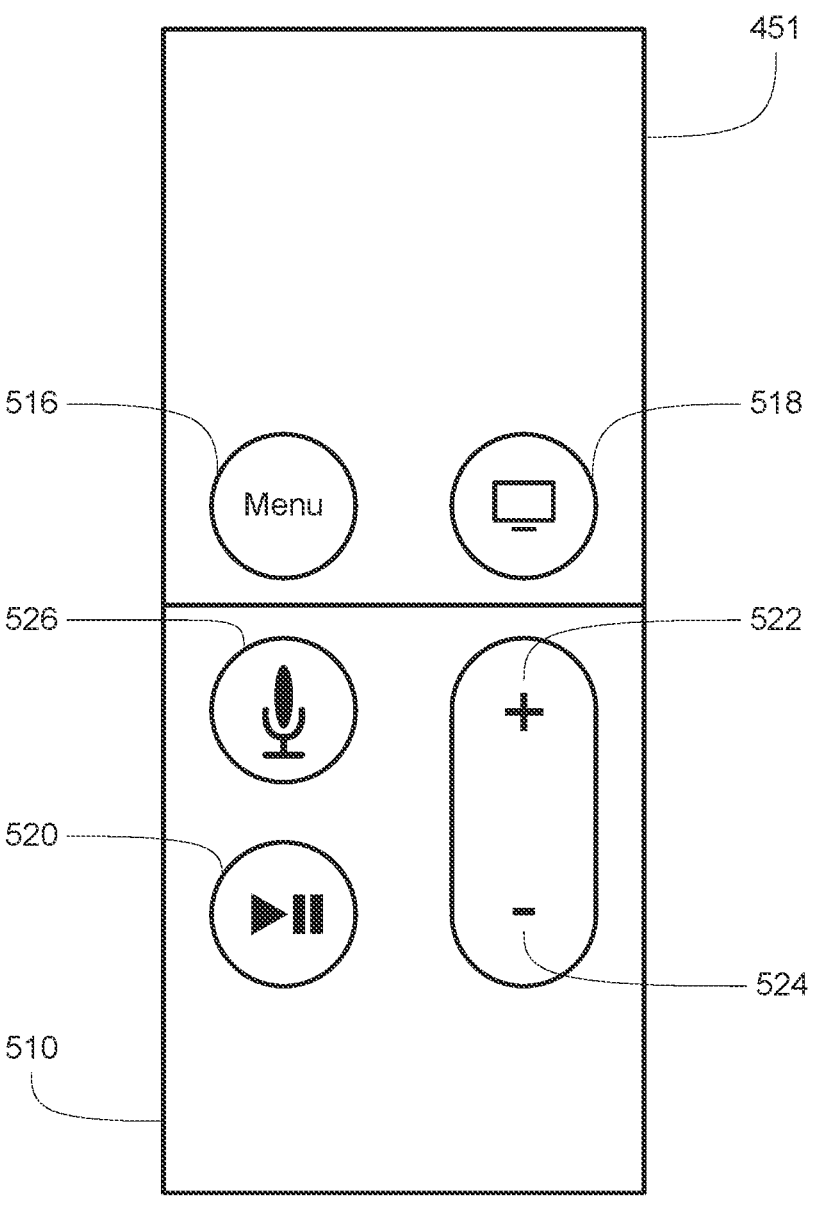

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
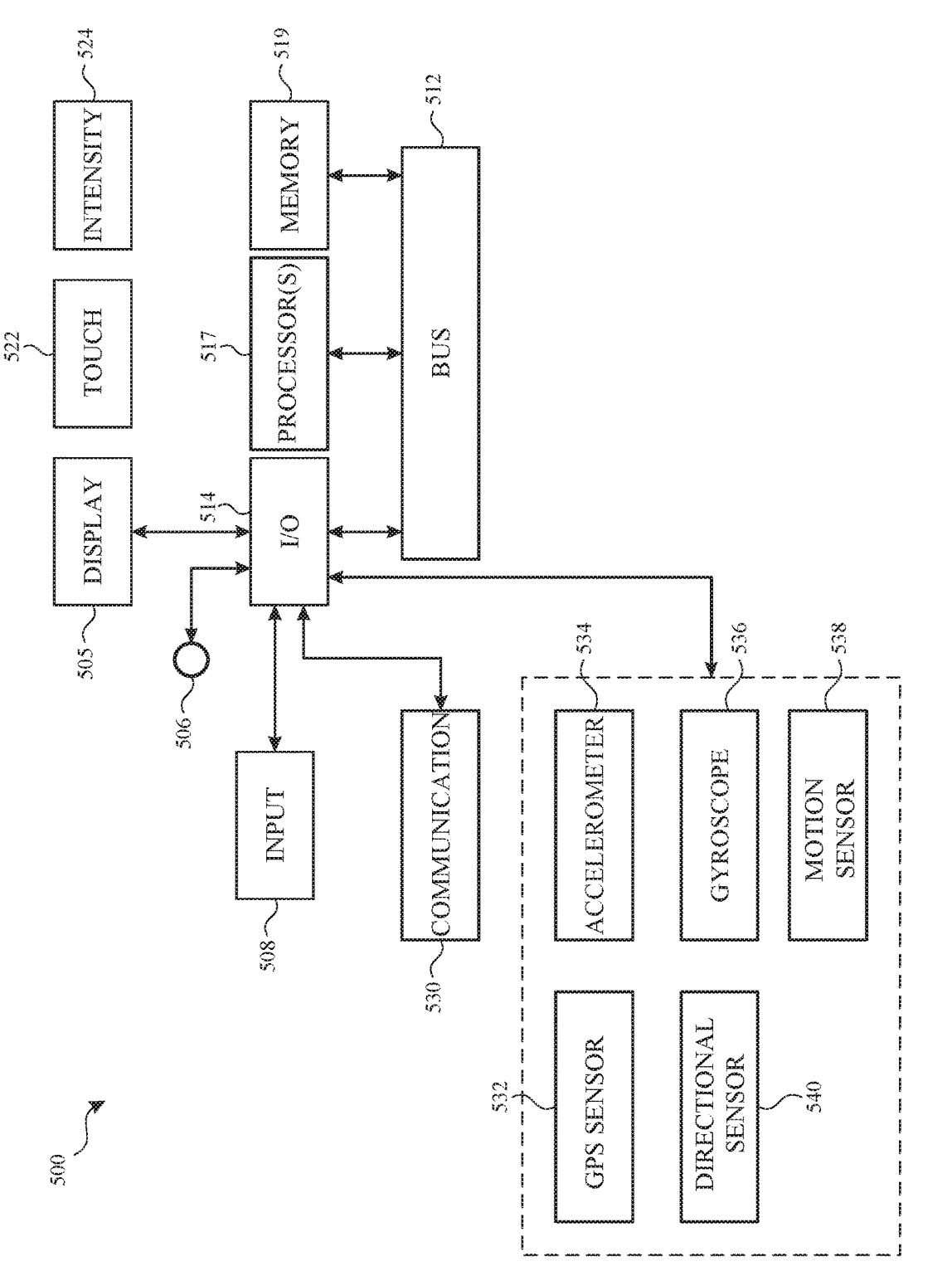

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 517 and memory 519. I/O section 514 can be connected to display 504, which can have touch-sensitive component 522 and, optionally, intensity sensor 524 (e.g., contact intensity sensor). In addition, I/O section 514 can be connected with communication unit 530 for receiving application and oper- ating system data, using Wi-Fi, Bluetooth, near field com- munication (NFC), cellular, and/or other wireless commu- nication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, acceler- ometer 534, directional sensor 540 (e.g., compass), gyro- scope 536, motion sensor 538, and/or a combination thereof, all of which can be operatively connected to I/O section 514.

Memory 519 of personal electronic device 500 can include one or more non-transitory computer-readable stor- age mediums, for storing computer-executable instructions, which, when executed by one or more computer processors 517, for example, can cause the computer processors to perform the techniques described below, including processes described with reference to FIGS. 6-11. A computer-read- able storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer- readable storage medium. The non-transitory computer- readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

As used here, the term "affordance" refers to a user- interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "execut- ing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not run- ning, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an appli- cation includes stopping and/or removing application pro- cesses for the application and removing state information for the application from the memory of the device. Generally, opening a second application while in a first application does not close the first application. When the second application is displayed and the first application ceases to be displayed, the first application becomes a background application.

One or more of the embodiments disclosed herein option- ally include one or more of the features disclosed in the following patent applications: "User Interfaces For Interact- ing with Channels that Provide Content that Plays in a Media Browsing Application", "User Interfaces For a Media Browsing Application", filed Mar. 24, 2019), and "User Interface Specific to Respective Content Items", filed Mar. 24, 2019), each of which is hereby incorporated by refer- ence.

Attention is now directed towards embodiments of user interfaces ("UI") and associated processes that are imple- mented on an electronic device, such as portable multifunc- tion device 100, device 300, or device 500.

User Interfaces and Associated Processes

Content Item Scrubbing Techniques

Users may wish to scrub through content items in user interfaces. In some circumstances, scrubbing through a content item reduces time spent for a user to navigate to desired content of the content item displayed on an elec- tronic device. As such, scrubbing through a content item allows the user to more efficiently view desired content, reduces the amount of time a user needs to perform opera- tions with the electronic device, and reduces the power usage of the electronic device, which increases battery life for battery-powered devices. It is understood that people use devices. When a person uses a device, that person is optionally referred to as a user of the device.

Figures 6A, 6B:
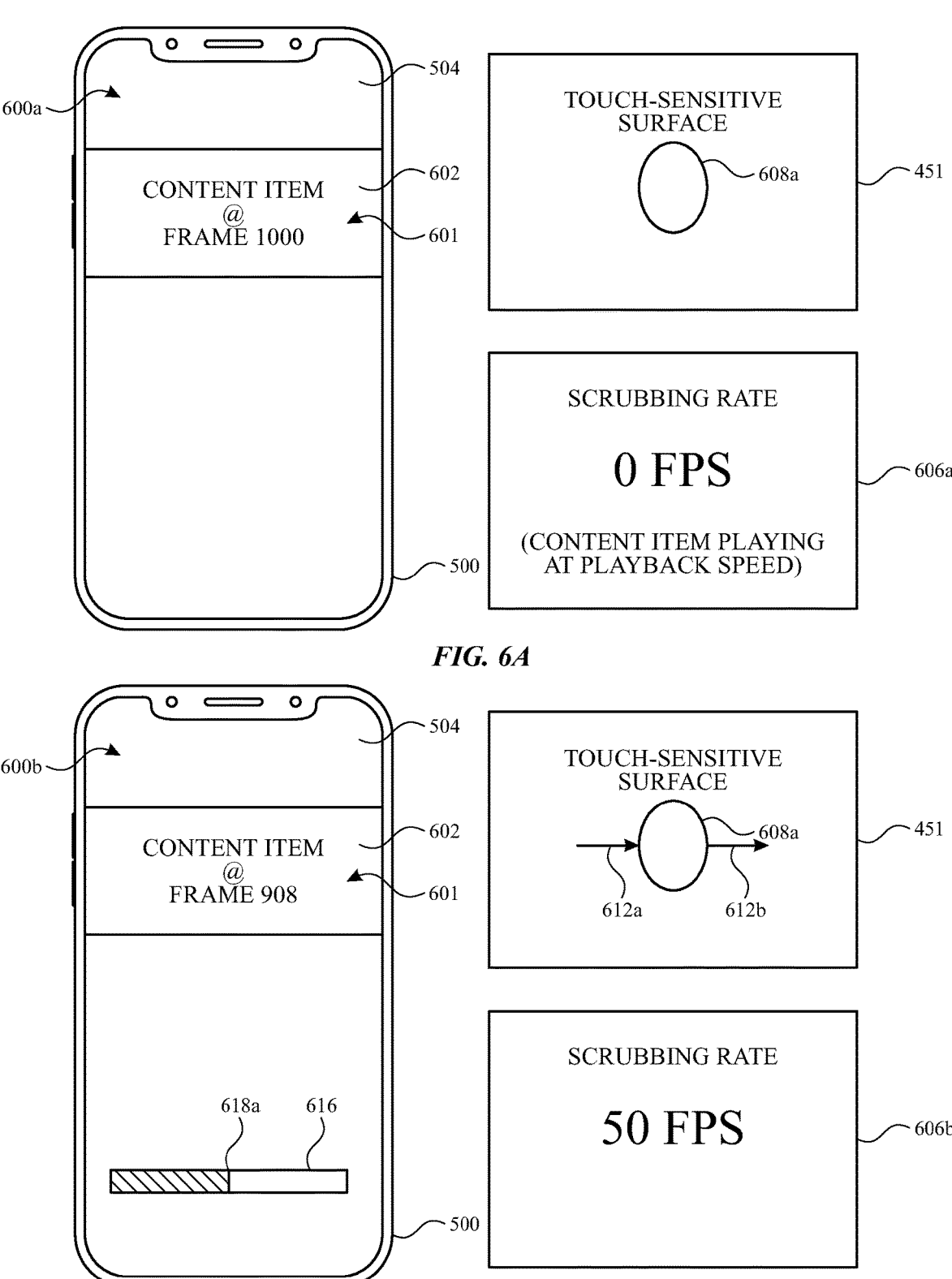
FIGS. 6A-6P include illustrations of user interfaces displayed via a display generation component on an electronic device that includes a content item scrubbing technique for scrubbing through a content item in accordance with some embodiments of the present disclosure.
Figures 6C, 6D:
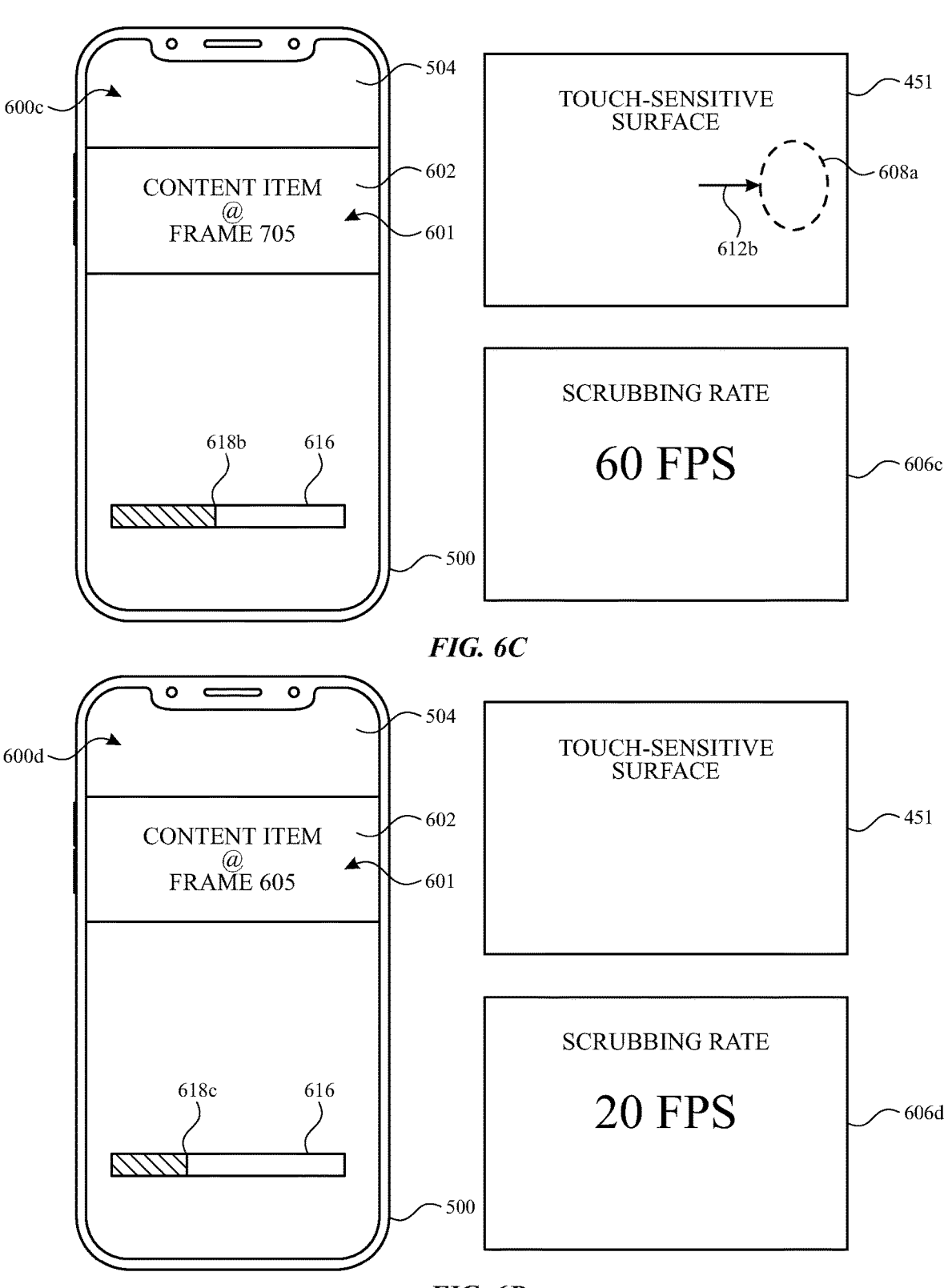
FIGS. 6Q-6S illustrate various graphs illustrating various features of a content item scrubbing technique in accordance with some embodiments of the present disclosure.
Figures 6E, 6F:
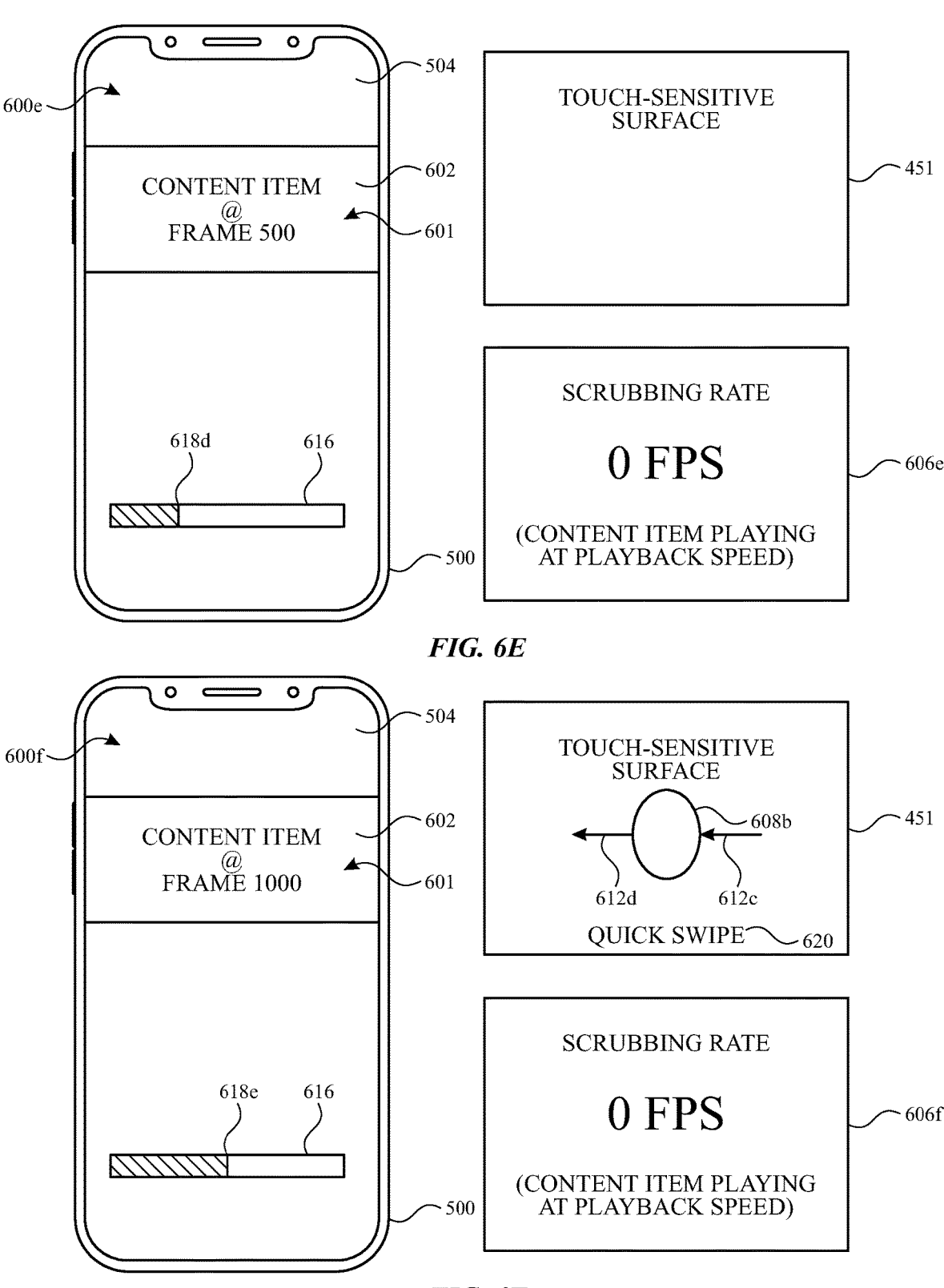
Figures 6G, 6H:
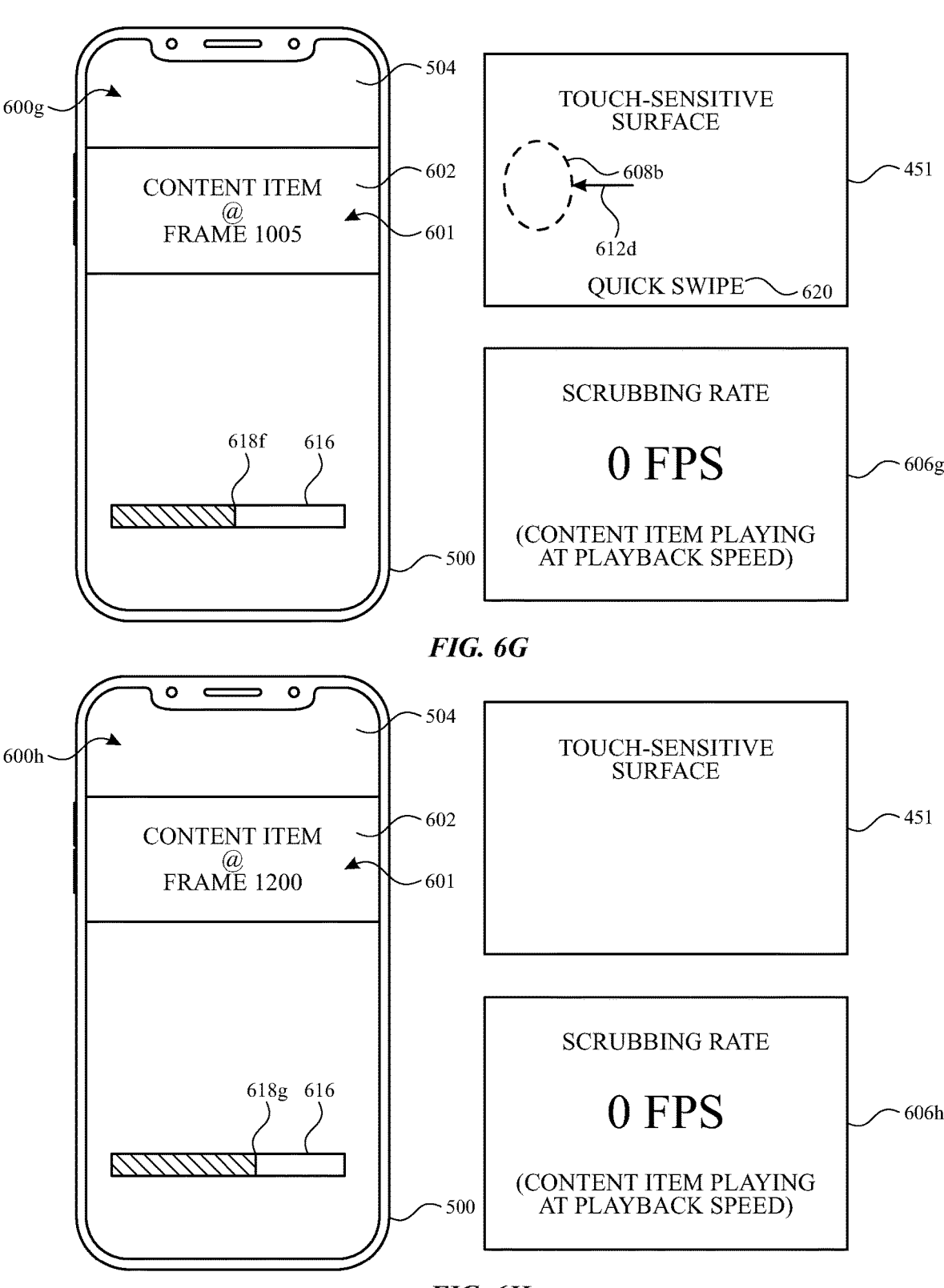
Figures 6I, 6J:
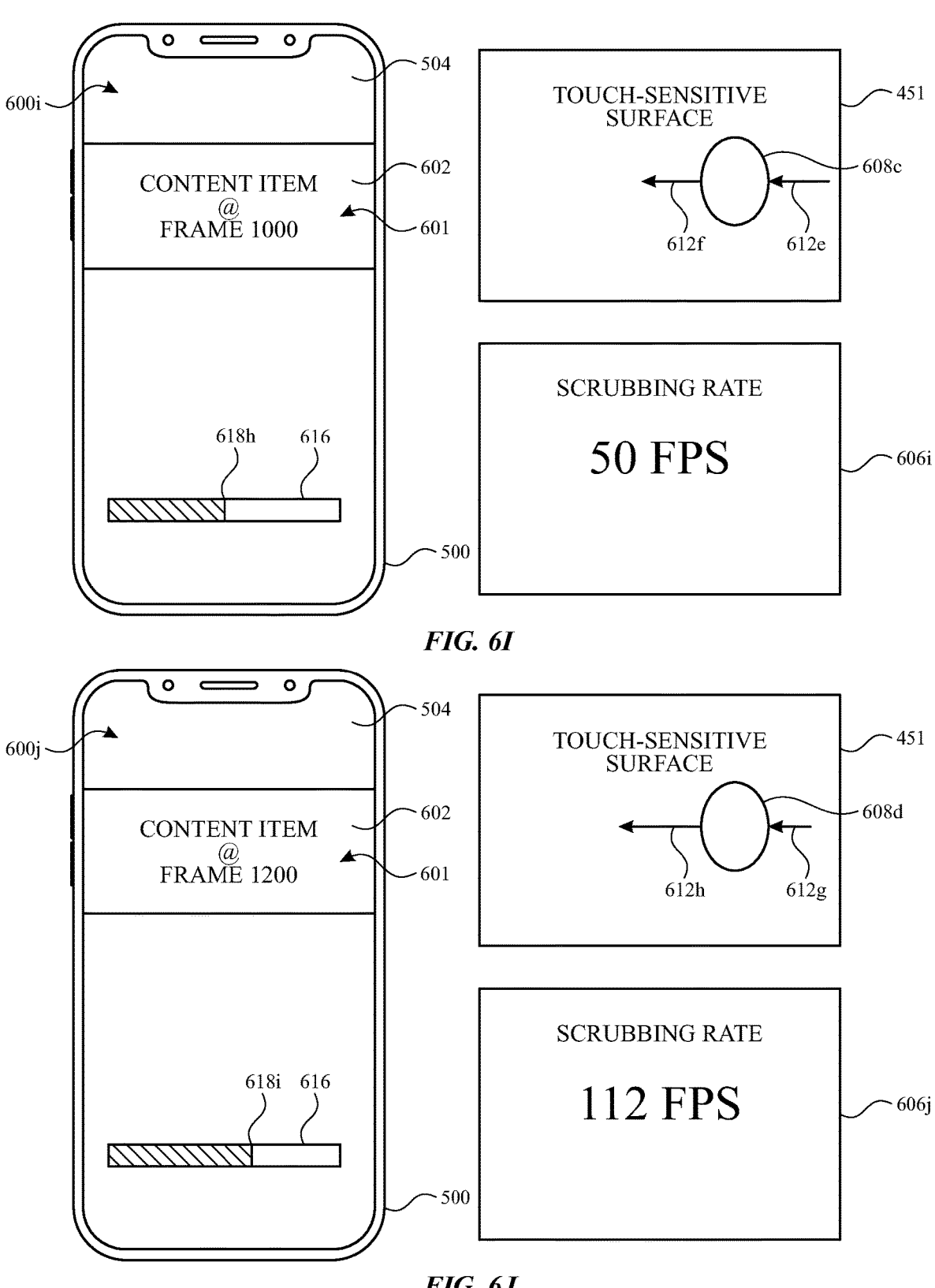
Figures 6K, 6L:
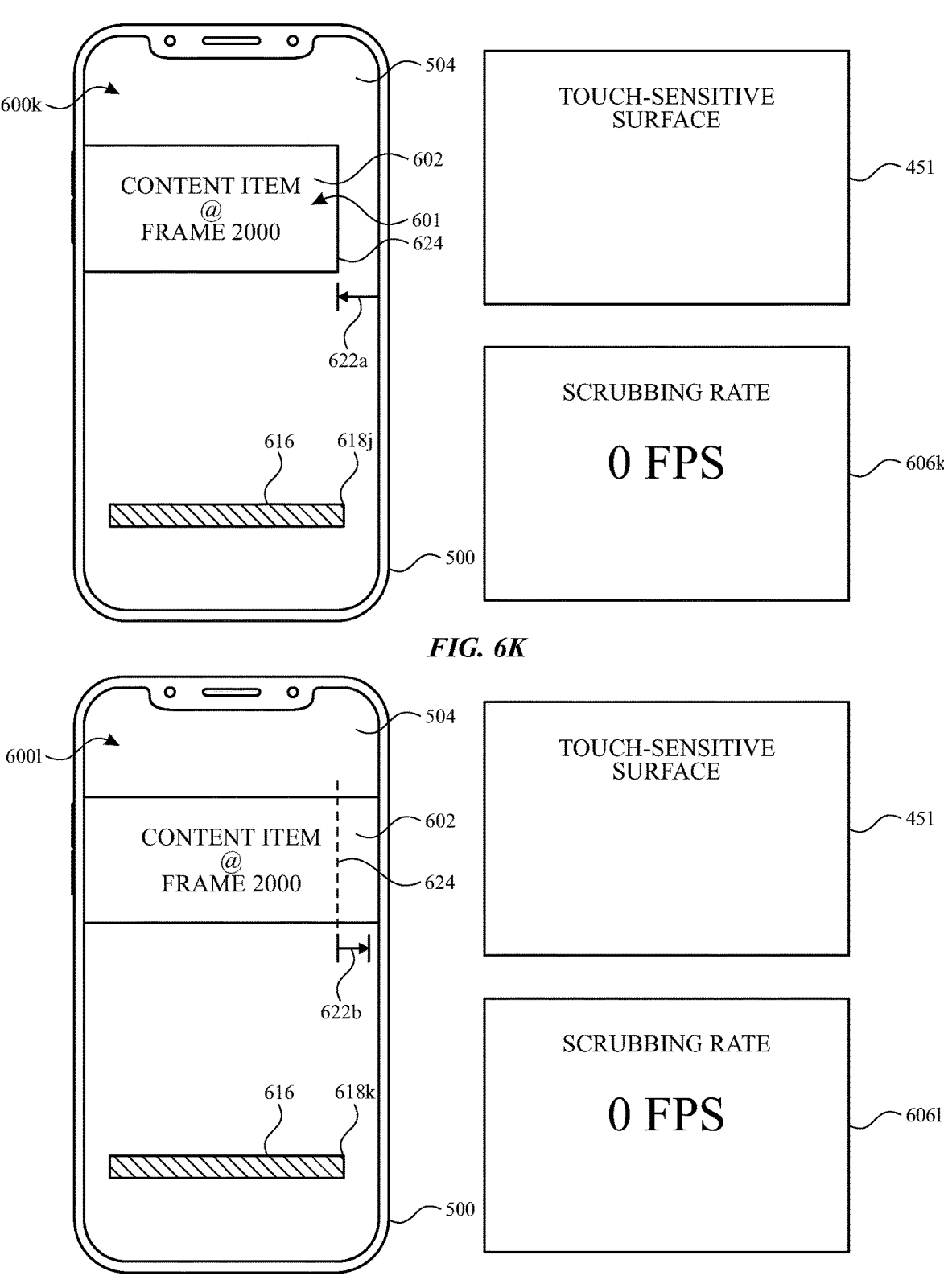
Figures 6M, 6N:
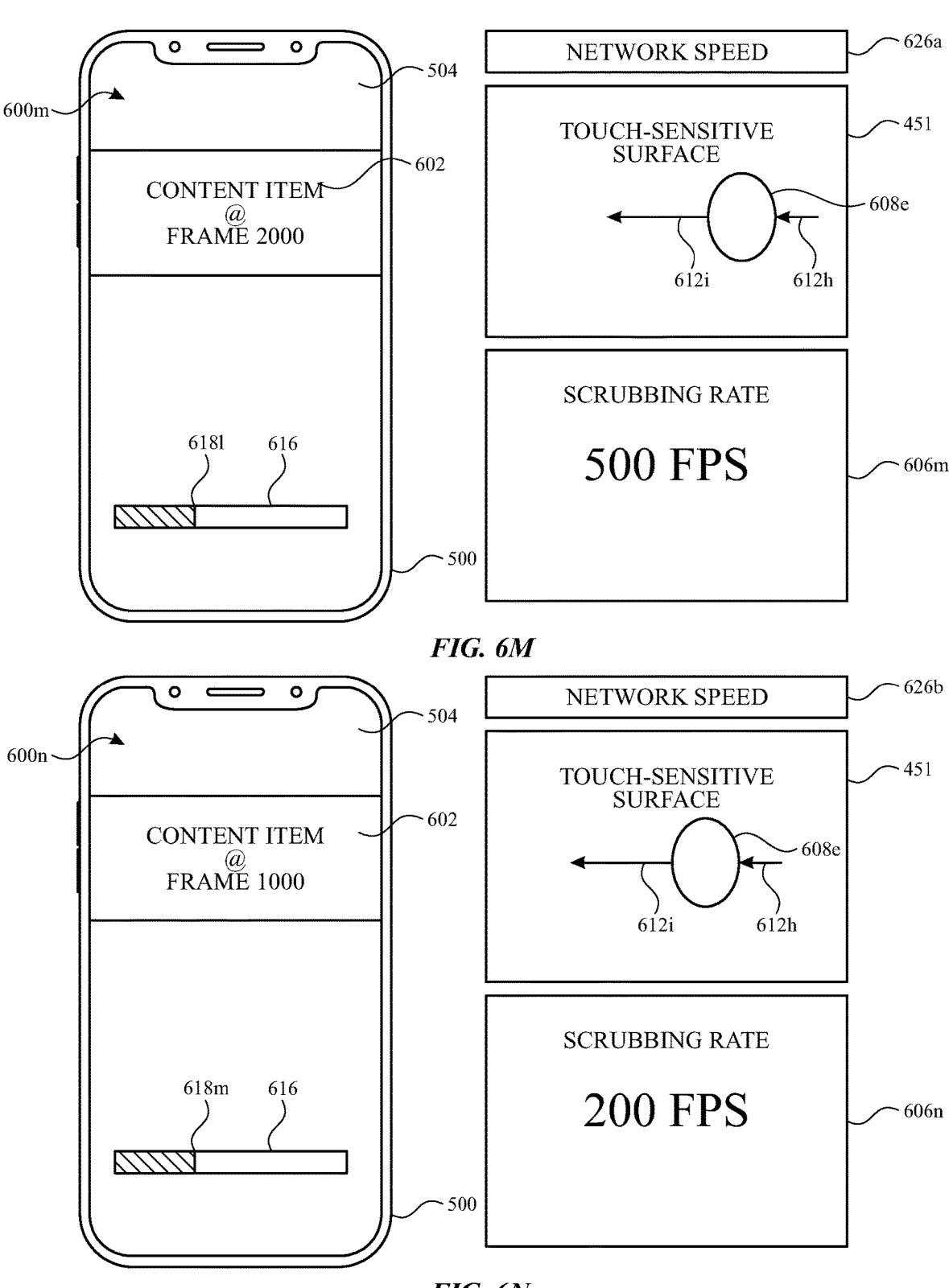
Figures 6O, 6P:
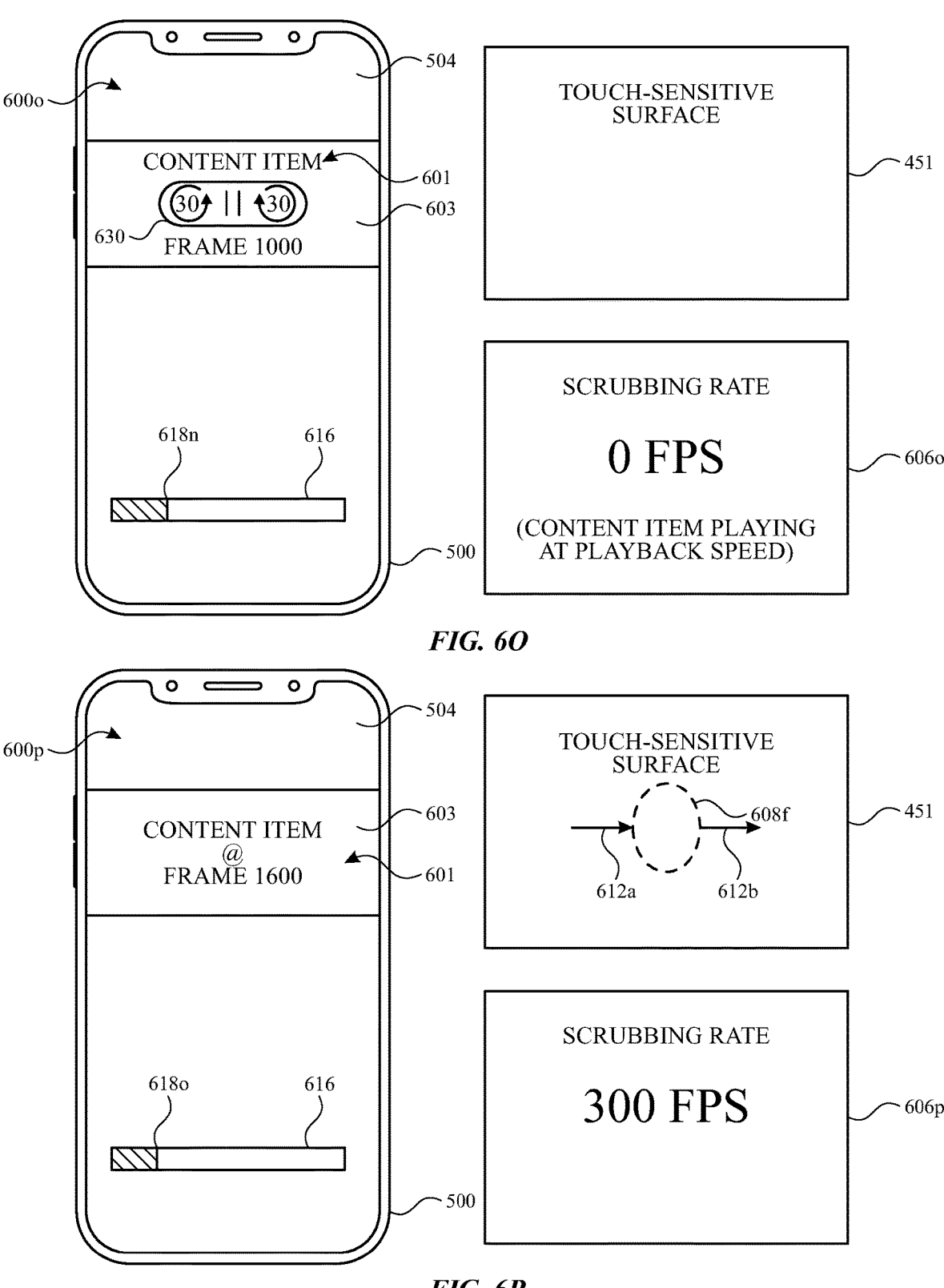
Figure 6Q:
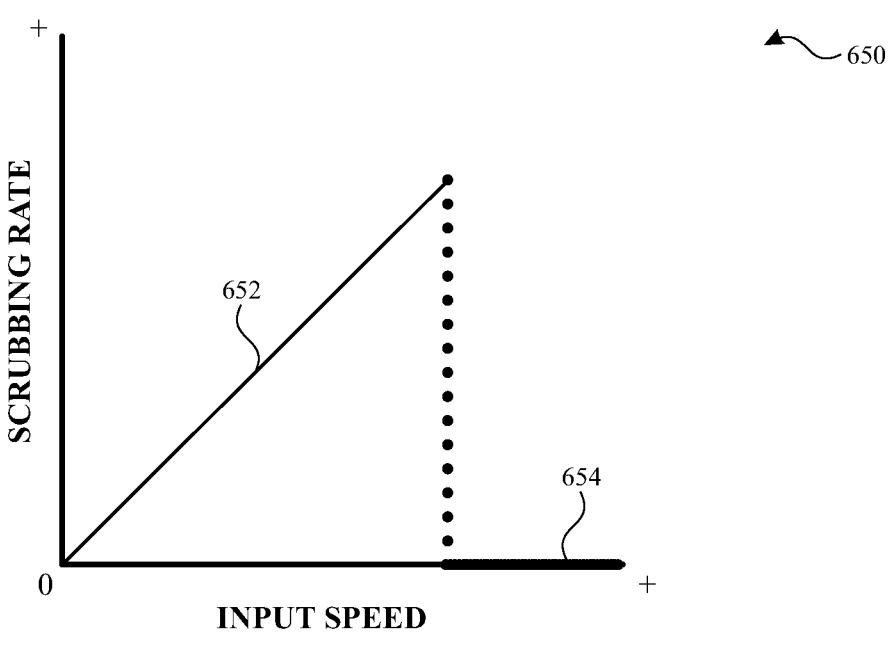
Figure 6R:
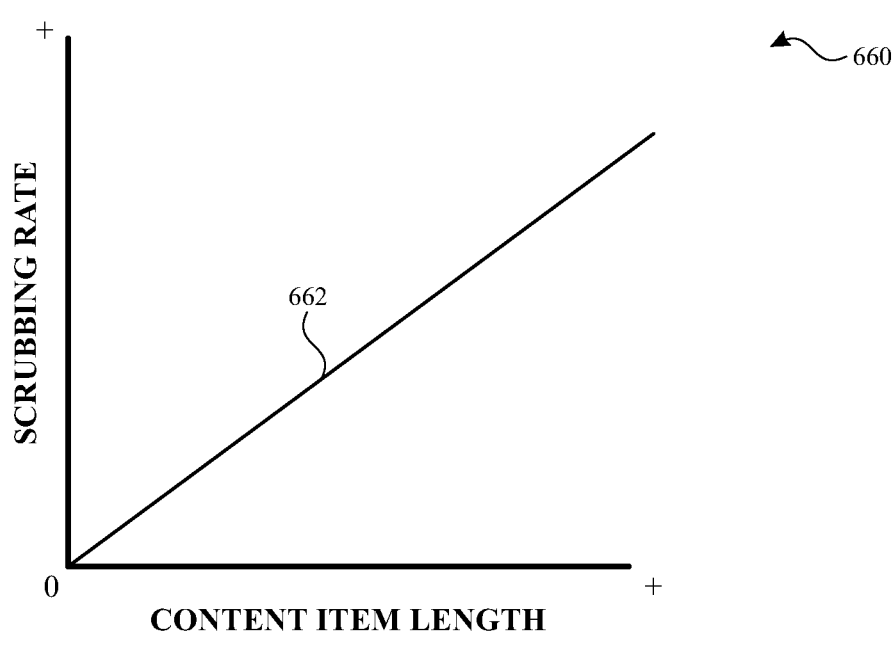
Figure 6S:
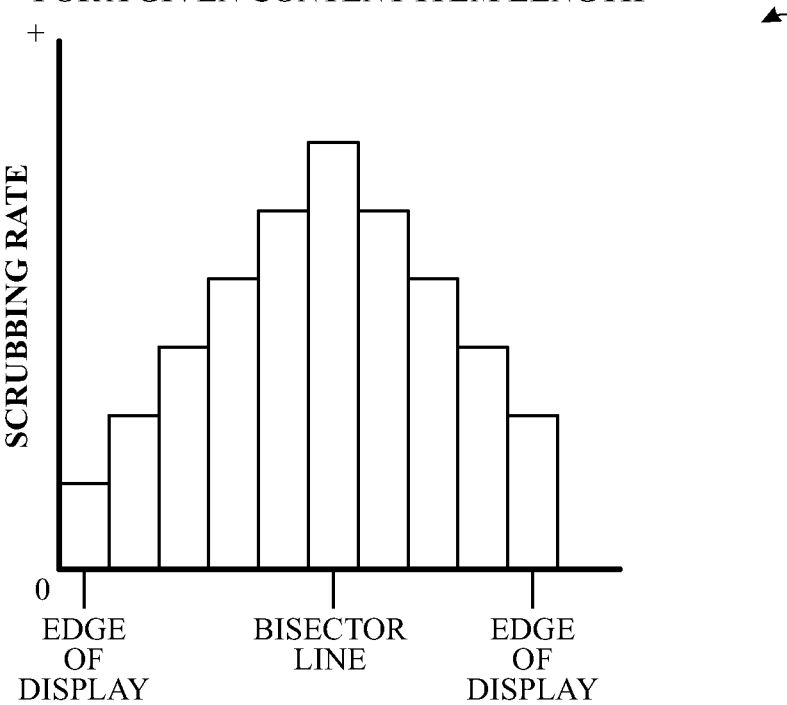

FIGS. 6A-6P include illustrations of user interfaces displayed via a display generation component on an electronic device that includes a content item scrubbing technique for scrubbing through a content item, in accordance with some embodiments of the present disclosure. FIGS. 6Q-6S illustrate various graphs illustrating various features of a content item scrubbing technique, in accordance with some embodiments of the present disclosure. The embodiments in these figures are used to illustrate the processes described below, including the processes described with reference to FIG. 7. Although FIGS. 6A-6S illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6S.

FIGS. 6A-6P include illustrations of user interfaces displayed via a display generation component on an electronic device that includes a content item scrubbing technique for scrubbing through a content item, in accordance with some embodiments of the present disclosure.

FIG. 6A illustrates a user interface 600a including a content item 602 displayed on the display generation component 504 of an electronic device 500 that includes a content item scrubbing technique, in accordance with some embodiments of the present disclosure.

The content item 602 is displayed on the display generation component 504 (e.g., a touch sensitive display) at a content item area 601 on the display generation component 504. Display of the content item 602 includes display of content (e.g., video and/or image data) corresponding to frame 1000 of the content item 602. The content item 602 optionally includes a plurality of frames configured for playback on the electronic device. A scrubbing rate 606a optionally corresponds to a rate of scrubbing through the content item 602. The scrubbing rate 606a is zero and the content item 602 is playing at a playback speed (e.g., 0.25×, 0.5×, 1×, 1.25×, 1.5×, or 2.0×). The playback speed is optionally user configurable.

In the illustrated embodiment of FIG. 6A, a touch contact 608a (e.g., a touchdown of a contact) is detected (e.g., received) on a touch sensitive surface 451, which optionally corresponds to a touch sensitive component of and/or on the display generation component 504 (e.g., in the case that display generation component 504 is a touch screen). The touch contact 608a is optionally detected anywhere on the display generation component 504. In some embodiments, the user interface 600a is displayed before, during, and after the touch contact 608a is received and/or detected on the touch sensitive surface 451. In some circumstances, while the content item 602 is playing at a playback speed, the touch contact 608a moves on the touch sensitive surface 451, as illustrated in FIG. 6B.

FIG. 6B illustrates a user interface 600b including the content item 602 displayed via the display generation component 504 on the electronic device 500 that includes a content item scrubbing technique, in which the touch contact 608a on the touch sensitive surface 451 is moving on the touch sensitive surface 451, in accordance with some embodiments of the present disclosure (e.g., a rightward swipe).

In the illustrated embodiment, the touch contact 608a has moved in a rightward direction on the touch sensitive surface 451, as illustrated by the representative arrow 612a, and the touch contact 608a is continuing to move in the same direction, as illustrated by the representative arrow 612b. The movement of the touch contact 608a (e.g., the movement illustrated by the representative arrow 612a) optionally satisfies scrubbing criteria (e.g., one or more first criteria). For example, the scrubbing criteria optionally includes a criterion that the movement of the touch contact 608a is under a threshold speed (e.g., 3 cm/s or 5 cm/s). In the illustrated embodiment, the movement of the touch contact 608a to the right on the touch sensitive surface 451 causes scrubbing in a backward direction (e.g., a re-wind direction) of the content item 602, as shown in the illustrated content item 602, which includes display of content (e.g., video and/or image data) corresponding to frame 908 of the content item 602. As such, the content item 602 has scrubbed from frame 1000 of the content item 602, as illustrated in FIG. 6A, to frame 908 of the content item 602, as illustrated in FIG. 6B. In addition, the scrubbing of the content item 602 is performed at the same size that the content item 602 had before scrubbing was initiated (e.g., as in FIG. 6A).

In the illustrated embodiment, the touch contact 608a and movement thereof is received on the touch sensitive surface 451 in a region corresponding to a region of the user interface 600b that does not include a scrubber bar 616 (e.g., a timeline bar corresponding to the content item that indicates a current playback position 618a in the content item 602). For example, the touch contact 608a and movement thereof is optionally received on the touch sensitive surface 451 in a region corresponding to a region of the user interface 600b that includes the content item area 601 (e.g., an area of the user interface 600b that is consumed by display of the content item 602), the area above the content item 602, and/or the area below the content item 602 (excluding the area of the display generation component 504 consumed by the scrubber bar 616). However, in some embodiments, a touch contact and movement thereof that meets scrubbing criteria such as the touch contact 608a and movement thereof is optionally received on the touch sensitive surface 451 in a region corresponding to a region of a user interface such as the user interface 600b that does include the scrubber bar 616. In such cases, the touch contact and movement thereof can be received on the scrubber bar 616 at any position along the scrubber bar and not only the current playback position indication such as the current playback position 618a displayed in the scrubber bar 616.

In response to receiving the touch contact 608a and the movement thereof, as indicated by the representative arrow 612a, the content item 602 is scrubbed at a scrubbing rate 606b, which is 50 frames per second. In some embodiments, a non-zero scrubbing rate such as the scrubbing rate 606b corresponds to an instantaneous scrubbing rate at a particular time during a scrubbing period. In some embodiments, a non-zero scrubbing rate such as the scrubbing rate 606b corresponds to a number of frames that is displayed in the user interface 600b (e.g., via the display generation component 504) per second (or skipped (from playback at playback speed) per second) during the scrubbing period. In some embodiments, a non-zero scrubbing rate such as the scrubbing rate 606b corresponds to an average of the number of frames that is displayed in the user interface 600b (e.g., via the display generation component 504) during the scrubbing period. In some embodiments, a non-zero scrubbing rate such as the scrubbing rate 606b corresponds to a rate of scrubbing through the content item 602 that is independent of a number of frames that is displayed in the user interface 600b during the scrubbing period. FIG. 6C illustrates a user interface 600c including the content item 602 displayed via the display generation component 504 on the electronic device 500 that includes a content item scrubbing technique, in which the touch contact 608a on the touch sensitive surface 451 is moving on the touch sensitive surface 451 and is at a point of liftoff from the touch sensitive surface 451, in accordance with some embodiments of the present disclosure.

In the illustrated embodiment, the touch contact 608a has moved again in a rightward direction on the touch sensitive surface 451, as illustrated by the representative arrow 612b on the touch sensitive surface 451, from its previous positions on the touch sensitive surface 451 illustrated in FIGS. 6A, 6B, and has reached a liftoff state (e.g., is no longer in contact with touch-sensitive surface 451). The movement of the touch contact 608a (e.g., the movement illustrated by the representative arrow 612b) optionally satisfies scrubbing criteria. In the illustrated embodiment, the movement of the touch contact 608a to the right corresponds to scrubbing in the backward direction (e.g., the re-wind direction) of the content item 602, as shown in the illustrated content item 602, which includes display of content (e.g., video and/or image data) corresponding to frame 705 of the content item 602. As such, using a disclosed content item scrubbing technique, the content item 602 has scrubbed from frame 1000 of the content item 602, as illustrated in FIG. 6A, to frame 908 of the content item 602, as illustrated in FIG. 6B, and to frame 705 of the content item 602, as illustrated in FIG. 6C. Further, the scrubbing of the content item 602 is performed at the same size of the content item 602 that the content item had before scrubbing was initiated (e.g., as in FIG. 6A).

In the illustrated embodiment, the touch contact 608a and movement thereof is optionally received on the touch sensitive surface 451 in a region corresponding to a region of the user interface 600c that does not include the scrubber bar 616 (e.g., a timeline bar corresponding to the content item that indicates a current playback position 618b in the content item 602). For example, the touch contact 608a and movement thereof is optionally received on the touch sensitive surface 451 in a region corresponding to a region of the user interface 600c that includes the content item area 601, the area above the content item 602, and/or the area below the content item 602 (excluding the area of the display generation component 504 consumed by the scrubber bar 616).

In response to receiving the touch contact 608a and the movement thereof, as indicated by the representative arrow 612b, the content item 602 is scrubbed at a scrubbing rate 606c, which, in the illustrated embodiment, is 60 frames per second. The scrubbing rate 606c is faster than the scrubbing rate 606b of FIG. 6B optionally because a speed of movement of the touch contact 608a in FIG. 6C is faster than a speed of movement of the touch contact 608a in FIG. 6B. That is, the touch contact 608a is optionally moving faster during movement of the touch contact 608a to the right, as indicated by the representative arrow 612b, than during the movement of the touch contact 608a to the right in FIG. 6B, as indicated by the representative arrow 612a in FIG. 6B. As such, a content item scrubbing technique optionally includes changing a scrubbing rate in accordance with a change in a speed of movement. Returning to FIG. 6C, the scrubbing rate 606c is the scrubbing rate of the content item 602 at the moment of the lift-off of the touch contact 608a from the touch sensitive surface 451. The liftoff state optionally corresponds to a state in which a user lifts off the user's finger from the touch sensitive surface 451. After the liftoff of the touch contact 608a from the touch sensitive surface

451, a content item scrubbing technique optionally continues scrubbing the content item 602, as illustrated in FIG. 6D.

FIG. 6D illustrates a user interface 600d including the content item 602 displayed via the display generation component 504 on the electronic device 500 that includes a content item scrubbing technique, after a scrubbing time period (e.g., 1 second or 3 seconds) from the moment of the lift-off of the touch contact 608a of FIG. 6C from the touch sensitive surface 451, in accordance with some embodiments of the present disclosure.

In the illustrated embodiment, no touch contact is detected on the touch sensitive surface 451. Yet, the touch contact 608a of FIG. 6C was moving when the touch contact 608a lifted off from the touch sensitive surface 451 (e.g., movement indicated by the representative arrow 612b of FIG. 6C). Relative movement between the touch contact 608a of FIG. 6C and the touch sensitive surface 451 in the same direction as in FIGS. 6B, 6C, was optionally detected when the touch contact 608a of FIG. 6C lifted off. As such, scrubbing through the content item 602 continues in the same direction as in FIGS. 6B, 6C so as to simulate an acceleration through the content item (e.g., an accelerated rate of display of the frames of the content item and/or a change in a simulated momentum of the display of the frames of the content item via scrubbing), as will be discussed with reference to the method 700 of FIG. 7. Returning to FIG. 6D, the content item 602 is scrubbed in the backward direction (e.g., the re-wind direction) of the content item 602, as shown in the illustrated content item 602, which includes display of content (e.g., video and/or image data) corresponding to frame 605 of the content item 602, and is currently at a current playback position 618c in the scrubber bar 616. As such, using a disclosed content item scrubbing technique, the content item 602 scrubbed from frame 1000 of the content item 602, as illustrated in FIG. 6A, to frame 908 of the content item 602, as illustrated in FIG. 6B, to frame 705 of the content item 602, as illustrated in FIG. 6C, and to frame 605 of the content item 602, as illustrated in FIG. 6D.

In response to detecting liftoff of the touch contact 608a, as discussed with reference to FIG. 6C, the content item 602 is scrubbed at a scrubbing rate 606c (e.g., 60 frames per second). The scrubbing rate of the content item 602 optionally decreases after detecting liftoff of the touch contact 608a. The scrubbing rate optionally decreases at a default rate or predetermined rate (e.g., 5 frames per second per second (e.g., frames per second squared), 10 frames per second per second, 40 frames per second per second) after detecting liftoff of the touch contact 608a. In the illustrated embodiment of FIG. 6D, the scrubbing rate has decreased from the scrubbing rate 606c of FIG. 6C to a scrubbing rate 606d, which is 20 frames per second.

FIG. 6E illustrates a user interface 600e including the content item 602 displayed via the display generation component 504 on the electronic device 500 that includes a content item scrubbing technique, when the scrubbing rate initiated by the touch contact 608a and movement thereof on the touch-sensitive surface 451, as illustrated in FIG. 6A-6D, reaches zero, in accordance with some embodiments of the present disclosure. In some embodiments, the moment that the scrubbing rate reaches zero occurs after a scrubbing time period from the scrubbing operation illustrated in FIG. 6D (and continued from FIGS. 6B-6E). The scrubbing time period optionally includes a first scrubbing time part and a second scrubbing time part. The first scrubbing time part is optionally a time period during which scrubbing through the content item 602 is occurring and the touch contact 608a is detected on the touch-sensitive surface 451, such as illustrated in FIG. 6B. The second scrubbing time part is optionally a time period during which scrubbing through the content item 602 is occurring and the touch contact 608a is not detected on the touch-sensitive surface 451 such as illustrated in FIG. 6D. Further, the second scrubbing time part is optionally based on a corresponding location on the display generation component 504 to which the location of touchdown of the touch contact 608 occurs and/or a speed of movement of the touch contact 608a and/or a relative speed between the touch contact 608a and the touch-sensitive surface 451 detected when the touch contact 608a lifted off of the touch-sensitive surface 451, such as illustrated in FIG. 6C.

As discussed earlier, a content item scrubbing technique optionally includes the decreasing (e.g., changing) a rate of scrubbing through the content item 602 after detecting liftoff of the touch contact 608a. In the illustrated embodiment of FIG. 6E, the scrubbing rate of the content has decreased from the scrubbing rate 606d of FIG. 6D to a scrubbing rate 606e of FIG. 6E, which is zero. The content item 602 is playing at its regular playback speed at a current playback position 618d in the scrubber bar 616. In some embodiments, to arrive at the user interface 600e, the electronic device 500 scrubs through the content item 602 in the same direction as in FIGS. 6C, 6D, and continues decreasing the scrubbing rate until the scrubbing rate reaches zero. In the illustrated embodiment of FIG. 6E, the content item 602 was scrubbed further in the backward direction (e.g., the re-wind direction) of the content item 602, as shown in the illustrated content item 602, which includes display of content (e.g., video and/or image data) corresponding to frame 500 of the content item 602. As such, using a disclosed content item scrubbing technique, the content item 602 has scrubbed from frame 1000 of the content item 602, as illustrated in FIG. 6A, to frame 908 of the content item 602, as illustrated in FIG. 6B, to frame 705 of the content item 602, as illustrated in FIG. 6C, to frame 605 of the content item 602, as illustrated in FIG. 6D, and to frame 500 of the content item 602, as illustrated in FIG. 6E.

It should be noted that the electronic device 500 optionally displays, via the display generation component 504, any number of frames between frame 1000 illustrated in FIG. 6A, to frame 908 illustrated in FIG. 6B, to frame 705 illustrated in FIG. 6C, to frame 605 illustrated in FIG. 6D, and to frame 500 illustrated in FIG. 6E during the scrubbing period from frame 1000 illustrated in FIG. 6A to frame 500 illustrated in FIG. 6E. For example, during the scrubbing period from frame 1000 illustrated in FIG. 6A to frame 500 illustrated in FIG. 6E, the electronic device 500 optionally displays up to the total amount of frame between frame 1000 and frame 500, inclusive (e.g., 10 frames, 20 frames, 100 frames, 292 frames, 396, or 501 frames).

FIG. 6F illustrates a user interface 600f including the content item 602 displayed via the display generation component 504 on the electronic device 500 that includes a content item scrubbing technique, in which a quick swipe 620 (e.g., as described in more detail with reference to method 700) on the touch sensitive surface 451 is being received, in accordance with some embodiments of the present disclosure.

Like the content item 602 in the user interface 600a of FIG. 6A, the content item 602 in the user interface 600f of FIG. 6F is displaying (e.g., video and/or image data corresponding to) frame 1000 of the content item 602. Also, the content item 602 in FIG. 6F is playing back at a playback speed.

In the illustrated embodiment, the touch contact 608b has moved in a leftward direction on the touch sensitive surface 451, as illustrated by the representative arrow 612c on the touch sensitive surface 451. The touch contact 608b is moving, as illustrated by the representative arrow 612d. In some embodiments, a content item scrubbing technique includes the electronic device 500 determining that the movement of the touch contact 608b does not satisfy the scrubbing criteria, but satisfies second criteria (e.g., skipping criteria, such as described in more detail with reference to method 700), including a criterion that the movement of the touch contact 608b is a quick movement (e.g., a quick swipe). For example, the second criteria optionally include a criterion that the movement of the touch contact 608b is above a threshold speed (e.g., 3 cm/s or cm/s). In response to determining that the one or more second criteria is satisfied, the electronic device 500 optionally does not scrub through the content item 602 like the scrubbing operation discussed with reference to FIGS. 6B, 6C, 6D. Indeed, as shown in the illustrated embodiment, during the movement of the touch contact 608b in which the movement satisfies the one or more second criteria, the scrubbing rate 606f is zero. The scrubbing rate 606f is zero during the movement of the touch contact 608b optionally because the movement of the touch contact 608b, as illustrated by the representative arrow 612c, satisfies a criterion of being above the threshold speed. It should be noted that in some embodiments, when the display generation component is displaying the user interface 600a of FIG. 6A (e.g., a user interface that does not include a scrubber bar for scrubbing a content item), and the electronic device receives a touch contact and movement thereof that meets the second criteria, such as the touch contact 608b and movement thereof, scrubber bar 616 is not displayed.

FIG. 6G illustrates a user interface 600g including the content item 602 displayed via the display generation component 504 on the electronic device 500 that includes a content item scrubbing technique, in which the touch contact 608b, and movement thereof, on the touch sensitive surface 451 includes the quick swipe 620 of FIG. 6F, and in which the touch contact 608b is at the point of liftoff from the touch sensitive surface 451 after moving on the touch sensitive surface 451, as illustrated in the representative arrow 612d, in accordance with some embodiments of the present disclosure.

As discussed with reference to FIG. 6F, the movement of the touch contact 608b, as indicated by the representative arrows 612c, optionally does not satisfy the scrubbing criteria, but satisfies second criteria (e.g., skipping criteria, such as described in more detail with reference to method 700). Returning to FIG. 6G, the movement of the touch contact 608b, as indicated by the representative arrows 612d, also optionally does not satisfy the scrubbing criteria, but satisfies the second criteria (e.g., skipping criteria, such as described in more detail with reference to method 700). Accordingly, the content item 602 is not scrubbed in response to detecting of the quick swipe 620.

The content item 602 in FIG. 6G is displaying video and/or image data corresponding to frame 1005 of the content item 602 corresponding to current playback position 618f in the scrubber bar 616. The scrubbing rate 606h is still zero in accordance with the movement of the touch contact 608b optionally because the movement of touch contact 608b satisfies the second criteria as discussed above with reference to FIG. 6F. The progression of frames from frame 1000 in FIG. 6F to frame 1005 (which is the current playback position 618f of the content item 602 in the illustrated embodiment) in FIG. 6G is a result of the content item 602 playing back at playback speed and not of scrubbing.

FIG. 6H illustrates a user interface 600h including the content item 602 displayed via the display generation component 504 on the electronic device 500 that includes a content item scrubbing technique, in which the electronic device detects liftoff of the touch contact 608b involved in the quick swipe 620 of FIG. 6F, in accordance with some embodiments of the present disclosure.

In the illustrated embodiment, content of the content item 602 is skipped in the forward direction (e.g., the fast-forward direction) of the content item 602, as shown in the illustrated content item 602, which includes display of content (e.g., video and/or image data) corresponding to frame 1200 of the content item 602, and is currently at a current playback position 618h in the scrubber bar 616. As such, using a disclosed content item scrubbing technique, the content item 602 has visually skipped, rather than visually scrubbed, from frame 1005 of the content item 602, as illustrated in FIG. 6G, and to frame 1200 of the content item 602, as illustrated in FIG. 6H. For example, after displaying the frame 1005, the display generation component 504 optionally displays the frame 1200. Further, using a disclosed content item scrubbing technique, the content item is playing beginning from frame 1200 in response to receiving the quick swipe 620.

FIG. 6I illustrates a user interface 600i including the content item 602 displayed via the display generation component 504 on the electronic device 500 that includes a content item scrubbing technique, in which a touch contact 608c is moving on the touch sensitive surface 451, in accordance with some embodiments of the present disclosure.

In the illustrated embodiment, the touch contact 608c has moved in a leftward direction on the touch sensitive surface 451, as illustrated by the representative arrow 612e, and the touch contact 608c is continuing to move in the same direction, as illustrated by the representative arrow 612f. Movement of the touch contact 608c (e.g., the movement illustrated by the representative arrow 612e) optionally satisfies scrubbing criteria. Movement of the touch contact 608c to the left causes (e.g., sustains and/or initiates) scrubbing in a forward direction (e.g., a fast-forward direction) of the content item 602, as shown in the illustrated content item 602, which includes display of content (e.g., video and/or image data) corresponding to frame 1000 of the content item 602. In response to receiving the touch contact 608c and the movement thereof, as indicated by the representative arrow 612e, the content item 602 is scrubbed at a scrubbing rate 606i, which, in the illustrated embodiment, is 50 frames per second.

In some embodiments, a second touch contact is detected while the electronic device 500 is scrubbing. For example, in response to detecting liftoff of the touch contact 608c, the electronic device 500 optionally continues scrubbing through the content item 602 (while optionally decreasing the scrubbing rate, as discussed with reference to FIG. 6D). While the electronic device 500 is continuing scrubbing in response to detecting liftoff of the touch contact 608c, the electronic device 500 detects a subsequent touch contact 608d that meets scrubbing criteria, as illustrated in FIG. 6J.

FIG. 6J illustrates a user interface 600j including the content item 602 displayed via the display generation component 504 on the electronic device 500 that includes a content item scrubbing technique, in which the touch contact 608d is moving on the touch sensitive surface 451 and meets scrubbing criteria, after the electronic device 500 detects liftoff of the touch contact 608c of FIG. 6I and while the electronic device 500 is continuing scrubbing since the liftoff of the touch contact 608c of FIG. 6I, in accordance with some embodiments of the present disclosure.

In response to receiving the touch contact 608d and the movement thereof, as indicated by the representative arrow 612g, the content item 602 is scrubbed at a scrubbing rate 606j, which is 112 frames per second. The touch contact 608d and movement thereof is optionally received on the touch sensitive surface 451 in a region corresponding to a region of the user interface 600 that does not include the scrubber bar 616 (e.g., a timeline bar corresponding to the content item that indicates a current playback position 618b in the content item 602).

In some embodiments, the touch contact 608d and movement thereof has a smaller or similar magnitude than the touch contact 608c and movement thereof but causes the content item 602 to scrub at a faster scrubbing rate than if the touch contact 608d and movement thereof was received when the scrubbing rate is zero. In some embodiments, the touch contact 608d and movement thereof has a similar magnitude and causes the content item 602 to scrub at a similar (e.g., a substantially equal) scrubbing rate as if the touch contact 608d and movement thereof was received when no scrubbing operation was being executed on the content item 602.

In some embodiments, the electronic device 500 continues scrubbing through the content item 602 after detecting liftoff of the touch contact 608d. In some embodiments, a scrubbing rate is non-zero while approaching a terminal frame (e.g., beginning or end) of the content item 602. In some embodiments, after detecting liftoff of a touch contact that meets scrubbing criteria such as the touch contact 608d, the scrubbing rate is still non-zero while approaching the terminal frame of the content item 602. In some embodiments, the scrubbing rate becomes zero, abruptly, when the terminal frame of the content item 602 is displayed. When the scrubbing rate becomes zero, abruptly, a content item scrubbing technique optionally includes shifting the display of the content item 602, as illustrated in FIG. 6K.

FIG. 6K illustrates a user interface 600k displayed via the display generation component 504 on the electronic device 500 that includes a content item scrubbing technique, in which the scrubbing rate 606k has become zero abruptly due to display of the content item 602 displaying a terminal frame of the content item 602 as a result of scrubbing, in accordance with some embodiments of the present disclosure.

In the illustrated embodiment, the electronic device 500 shifts the display of the content item 602 to the leftward direction in user interface 600k (e.g., performs a first shift), as indicated by the representative arrow 622a, in response to the scrubbing rate 606k becoming zero abruptly due to display of the content item 602 including display of content (e.g., video and/or image data) corresponding to terminal frame 2000 of the content item 602 as a result of scrubbing. The current playback position 618j is the end of the content item 602, as indicated by the scrubber bar 618. A right edge of the content item 602 is located at the first edge location 624. In the illustrated embodiment of FIG. 6K, the content item area 601 is smaller compared with the content item area 601 of FIGS. 6A-6J. A content item scrubbing technique optionally includes increasing a content item area after shifting the display of the content item, as illustrated in FIG. 6L.

FIG. 6L illustrates a user interface 600l displayed via the display generation component 504 on the electronic device

500 that includes a content item scrubbing technique, in which a display of the content item 602 shifts in the rightward direction (e.g., performs a second shift), as indicated by the representative arrow 622b, after the right edge of the content item 602 reaches the first edge location 624, in accordance with some embodiments of the present disclosure. The time period of the shift in the leftward direction, as illustrated in FIG. 6K optionally equals the time period of the shift in the rightward direction, as illustrated in FIG. 6L. Further, in the illustrated embodiment of FIG. 6L, the content item area 601 is equal to the content item area 601 of FIGS. 6A-6J and is larger than the content item area 601 of FIG. 6K. Also, in the illustrated embodiment, the scrubbing rate 606l is zero.

It should be noted that a content item scrubbing technique optionally includes shifting the display of the content item 602 in the right-ward direction in response to the scrubbing rate abruptly becoming zero due to display of the content item 602 including display of content corresponding to a terminal frame of the content item 602 as a result of scrubbing to a beginning frame of the content item 602 (e.g., scrubbing backwards to frame zero of the content item 602) in a similar way as discussed above with the reference to FIG. 6J.

In some embodiments, the shifting behavior (e.g., the first shift and the second shift) described herein is performed when a touch contact is currently on the touch-sensitive surface 451 when a terminal frame of the content item is displayed. The second shift optionally does not initiate until liftoff of the touch contact.

FIG. 6M illustrates a user interface 600m displayed via the display generation component 504 on the electronic device 500 that includes a content item scrubbing technique, in which a network connection speed of the electronic device 500 is a first network connection speed, in accordance with some embodiments of the present disclosure.

In the illustrated embodiment, the touch contact 608e has moved in a leftward direction on the touch sensitive surface 451, as illustrated by the representative arrow 612h, and the touch contact 608e is continuing to move in the same direction, as illustrated by the representative arrow 612i. Movement of the touch contact 608e optionally satisfies the scrubbing criteria. Movement of the touch contact 608e to the left causes scrubbing in a forward direction (e.g., a fast-forward direction) of the content item 602 in a similar way as discussed with reference to FIG. 6I. In the illustrated embodiment, the content item 602, during a particular time of the scrubbing period, displays content (e.g., video and/or image data) corresponding to frame 1000 of the content item 602.

The electronic device 500 of FIG. 6M has a network speed 626a (e.g., a network connection speed that is 40 Mbps or more). A content item scrubbing technique optionally includes determining a network connection speed of the electronic device 500 and causing scrubbing in accordance with the network connection speed. As such, in response to receiving the touch contact 608e and the movement thereof, as indicated by the representative arrow 612h, and in response to detecting that the electronic device 500 has the network speed 626a, the content item 602 is scrubbed at a scrubbing rate 606m, which, in the illustrated embodiment, is 500 frames per second. The network speed 626a is optionally a connection over which the content item 602 is being received/streamed.

FIG. 6N illustrates a user interface 600n displayed via the display generation component 504 on the electronic device 500 that includes a content item scrubbing technique, in which a network connection speed of the electronic device is a second network connection speed, in accordance with some embodiments of the present disclosure.

In the illustrated embodiment, electronic device 500 receives the same touch contact 608e on the touch sensitive surface 451 and the content item 602 is at the same playback position 618l of the content item as in FIG. 6M (e.g., playback position 618l equals playback position 618m in the content item 602). In the illustrated embodiment, the touch contact 608e has moved in a leftward direction on the touch sensitive surface 451, as illustrated by the representative arrow 612h, which is the same representative arrow 612h as in FIG. 6M, and the touch contact 608e is continuing to move in the same direction, as illustrated by the representative arrow 612i, which is the same representative arrow 612i as in FIG. 6M. Movement of the touch contact 608e optionally satisfies the scrubbing criteria and is optionally the same as the movement of contact 608e in FIG. 6M. In the illustrated embodiment of FIG. 6N, movement of the touch contact 608h to the left causes scrubbing in a forward direction (e.g., a fast-forward direction) of the content item 602 in a similar way as discussed with reference to FIG. 6I. In the illustrated embodiment, the content item 602, during a particular time of the scrubbing period, displays content (e.g., video and/or image data) corresponding to frame 1000 of the content item 602.

In the illustrated embodiment, the electronic device 500 has a network speed 626b, which is a network connection speed that is lower that the network speed 626a of FIG. 6M. As discussed with reference to FIG. 6M, a content item scrubbing technique optionally includes determining a network connection speed of the electronic device 500 and causing scrubbing in accordance with the network connection speed. In response to receiving the touch contact 608e and the movement thereof, as indicated by the representative arrow 612h, and in response to detecting that the electronic device 500 has the network speed 626b, the content item 602 is scrubbed at a scrubbing rate 606n, which is 200 frames per second and is less that the scrubbing rate 606m of FIG. 6M. As such, in some embodiments, in response to detecting that the electronic device has a faster network connection speed (e.g., more available bandwidth), such as the network speed 626a, and an input that meets scrubbing criteria, a content item scrubbing technique scrubs the content item 602 at a faster scrubbing rate than a scrubbing rate initiated in response to detecting a slower network connection speed (e.g., less available bandwidth), such as the network speed 626b and the input that meets the scrubbing criteria. The network speed 626b is optionally a connection over which the content item 602 is being received/streamed.

FIG. 6O illustrates a user interface 600o including the content item 603 and playback controls 630 displayed via the display generation component 504 on the electronic device 500 that includes a content item scrubbing technique, in accordance with some embodiments of the present disclosure. In some embodiments, the playback controls 630 are displayed in response to detecting a tap of a touch contact on the touch-sensitive surface 451 while the content item 602 is playing.

The content item 603 includes more frames than the content item 602 and is playing at a same playback speed as the content item 602 in FIG. 6A and optionally a same frame rate (e.g., a same number of frames per second that are display during playback of the content item without scrubbing). As such, as shown in the scrubber bar 616, current playback position 618n corresponding to frame 1000 of the content item 603 is closer to a beginning of the scrubber bar 616*n* (e.g., the left end of the scrubber bar 616) than current playback position 618*a* corresponding to frame 1000 of the content item 602 in FIG. 6B.

In the illustrated embodiment of FIG. 6O, the playback controls 630 include a skip backwards 30 second control icon, a pause control icon, and a skip forward 30 seconds control icon. In some embodiments, the playback controls include additional or alternative playback controls than the playback controls illustrated in FIG. 6O. For example, in some embodiments, the playback controls 630 include a "play" control icon.

The content item 602 is playing while the displaying the playback controls 630, as indicated in the scrubbing rate 606*o* glyph, and the scrubbing rate 606*o* is zero. The content item 602 is playing at a current playback position 618*n* in the content item 602, as shown in the scrubber bar 616. In response to receiving an input that meets scrubbing criteria, a content item scrubbing technique includes hiding or removing the playback controls 630, while continuing to display the scrubber bar 616, as illustrated in FIG. 6P.

FIG. 6P illustrates a user interface 600*p* including the content item 602 displayed via the display generation component 504 on the electronic device 500 that includes a content item scrubbing technique, in accordance with some embodiments of the present disclosure. The user interface 600*p* is optionally displayed after a scrubbing time period corresponding to the movement of the input, as represented by the representative arrow 612*a*.

In the illustrated embodiment, the touch contact 608*f*, includes the same characteristics of the touch contact 608*a* of FIG. 6B, and the movement of the touch contact 608*a* in FIG. 6P includes the same characteristics of the touch contact 608*a* of FIG. 6B. The scrubbing rate 606*p* corresponding to the movement of the touch contact 608*f* is 300 frames per second. Although the characteristics of the touch contact 608*f* and the movement thereof on the touch sensitive surface 451 is identical to the characteristics of the touch contact 608*a* and the movement thereof in FIG. 6B, a content item scrubbing technique optionally causes the scrubbing rate 606*p* to be faster than the scrubbing rate 606*b* because the content item 603 is longer than the content item 602.

It should be noted that the scrubbing rate illustrated and discussed above are for illustrative purposes and are non-limiting. For example, a scrubbing rate is optionally on the order of 0.1, 1, 10, 100, 1,000, 10,000, 10,000 or higher, frames per second. In addition, other scrubbing rate possibilities are possible such as scrubbing rates on an order lower than 0.1 frames per second. The illustrated scrubbing rates and the discussed rates of change of scrubbing rate should be interpreted as illustrative and non-limiting.

FIGS. 6Q-6R illustrate various graphs illustrating various features of a content item scrubbing technique, in accordance with some embodiments of the present disclosure.

FIG. 6Q illustrates a graph 650 of scrubbing rate versus input speed (also referred to herein as "speed of movement") for a given content item, in accordance with some embodiments of the present disclosure. The line segment 652 shows a positive correlation of scrubbing rate as input speed increases (e.g., a positive linear or exponential relationship). As speed of movement of a touch contact increases and continues to meet the scrubbing criteria, the resulting scrubbing rate likewise increase, as illustrated in FIGS. 6B, 6C. The line segment 654 shows no correlation (e.g., a neutral or zero correlation) between scrubbing rate and input speeds larger than any of the input speeds corresponding to the line segment 652. For example, the scrubbing criteria optionally includes a criterion that the speed of movement of the input is below a threshold speed of movement, as discussed above with reference to FIG. 6B. In response to the speed of movement of the input exceeding the threshold speed of movement, a content item scrubbing technique optionally includes forgoing scrubbing the content item, such as illustrated with the line segment 654 on the graph 650, and optionally, skipping content of the content item, as discussed with reference to FIG. 6G. In some embodiments, no threshold input speed beyond which scrubbing rate becomes zero is present. In some embodiments, a threshold input speed is present, but the scrubbing rate does not increase nor decrease to zero in response to input speeds beyond the threshold input speed.

FIG. 6R illustrates a graph 660 of scrubbing rate versus content item length for a given input speed that meets scrubbing criteria, in accordance with some embodiments of the present disclosure. The line segment 662 shows a positive correlation (e.g., a positive linear or exponential relationship) of scrubbing rate as function of content item length (e.g., length in frames and/or length in time), keeping input speed constant. Such relationship is likewise illustrated between FIGS. 6B and 6P, as discussed above.

FIG. 6S illustrates a graph 670 of scrubbing rate versus input location for a given content item and/or a given network connection speed, in accordance with some embodiments of the present disclosure. Input (e.g., a touch down of a touch contact performing a swipe input) received closer to a center of the electronic device 500 and meeting scrubbing criteria optionally results in faster scrubbing rates than inputs received closer to an edge of the electronic device. For example, a center of the display generation component 504 is optionally a bisector that vertically bisects the display generation component 504. In response to receiving an input closer to or on the bisector, and in accordance with a determination that the input meets scrubbing criteria, the scrubbing rate is optionally faster than a scrubbing rate resulting from the same input for scrubbing through the content item at different location corresponding to a portion of the user interface that is further from the bisector.

FIG. 7 is a flow diagram illustrating a method 700 for scrubbing a content item, in accordance with some embodiments of the present disclosure. The method 700 is optionally performed at an electronic device such as device 100, device 300, or device 500 as described above with reference to FIGS. 1A-1B, 2-3, 4A-4B and 5A-5C. Some operations in method 700 are, optionally combined and/or order of some operations is, optionally, changed.

As described below, the method 700 provides ways in which a content item is scrubbed using one or more disclosed content item scrubbing techniques. The method enhances content item scrubbing and reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, the method 700 is performed at an electronic device in communication with a display generation component and one or more input devices. For example, the electronic device (e.g., the electronic device 500) is a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external). In some embodiments, the display generation component (e.g., the display generation component 504) is a display integrated with the electronic device (optionally a touch screen display), external display such as a monitor, projector, television, or a hardware component (optionally integrated or external) for projecting a user interface or causing a user interface to be visible to one or more users. In some embodiments, the display is integrated with the electronic device as a touch screen display that includes a touch sensitive surface such as the touch sensitive surface 451 of FIGS. 6A-6P. In some embodiments, method 700 is performed in or at an automobile infotainment system, such as one including one or more displays and/or touch screens and/or one in communication with one or more displays and/or touch screens.

In some embodiments, the electronic device displays (702a), via the display generation component, a user interface including a content item, such as the user interface 600a including content item 602 in FIG. 6A or the user interface 600p including the content item 603 in FIG. 6P. The content item is optionally playing and the user interface is optionally a content playback user interface of a content browsing and/or playback application). In some embodiments, the display generation component displays (at the same time or different times) multiple applications and/or user interfaces associated with the multiple applications. For example, as will be described later, in some embodiments, the display generation component displays a first application and the user interface including the content item, whereby the application is different from the user interface including the content item and optionally of a different size than the user interface including the content item. In some embodiments, the content item is playing. In some embodiments, the content item is not playing. In some embodiments, when the content item is not playing, a scrubbing operation on the content item is executing, as will be described in more detail below. In some embodiments, the content item is a movie, a television show, a music video or any other content item that includes visual content.

In some embodiments, while displaying the user interface including the content item (702b), the electronic device receives (702c), via the one or more input devices, an input for scrubbing through the content item, such as the input illustrated in FIG. 6A. In some embodiments, the input for scrubbing through the content item includes a first part directed to a region corresponding to a portion of the user interface that does not include a scrubber bar (702d), such as the touch contact 608a in FIG. 6A touching down on touch-sensitive surface 451 corresponding to a portion of the user interface outside of a scrubber bar 616 (e.g., the scrubber bar 616 of FIG. 6B, a timeline bar of the content item and/or a timeline bar for navigating through the content item), and a second part including movement in the region (702e), such as the movement of the touch contact 608a in FIG. 6B, as indicated by the representative arrows 612a, 612b. In some embodiments, the input is received via a touch-sensitive surface such as the touch-sensitive surface 451 (e.g., a touch-sensitive display or touch screen). For example, the first part of the input optionally corresponds to touchdown of a contact (e.g., the touch contact 608a of FIG. 6A) on the touch screen in a region of the user interface that does not include a scrubber (e.g., the scrubber bar 616 of FIG. 6B and/or a timeline of the content item). In some embodiments, the scrubber bar is displayed when the touchdown of the contact is detected. In some embodiments, the scrubber bar is not displayed when the touchdown of the contact is detected (e.g., as in FIG. 6A). The second part including movement in the region optionally corresponds to movement of the contact while remaining in contact with the touch screen in the region. In some embodiments, the input is received via an input device different from a touch screen. For example, in some embodiments, the input is received via a keyboard/mouse such as the keyboard/mouse 350 of FIG. 3. For example, the first part of the input optionally corresponds to a pointer on a computer in a region outside of the scrubber bar, and a user clicking (e.g., a left click) the mouse. The second part of the input including movement in the region optionally includes movement of the pointer of the mouse while being in the left clicked configuration (e.g., while the left click is maintained) and while remaining in the region. In some embodiments, the input begins in the region (e.g., touchdown of the contact occurs in the region) and subsequent movement of the contact causes the contact to move to the region of the user interface that includes the scrubber bar—in such circumstances, the electronic device optionally responds in the same manner as described below with reference to the above-described input.

In some embodiments, in response to receiving the input for scrubbing through the content item, and in accordance with a determination that the input for scrubbing through the content item satisfies one or more first criteria, the electronic device scrubs (7020 through the content item in accordance with the movement in the region, such as illustrated by the scrubbing rates 606b-606d in FIGS. 6B-6D. A scrubbing operation is optionally initiated without input being directed to the scrubber bar (e.g., the scrubber bar 616). For example, a user may want to scrub through a content item displayed on the display generation component. The user may provide an input such as the above-described input for scrubbing through the content item to scrub through the content item to arrive at a desired position within the content item. The one or more first criteria optionally includes a criterion related to the movement of the second part of the input. In some embodiments, the criterion includes the movement in the region, such as the movement represented by representative arrows 612a, 612b satisfying certain criteria. For example, the criterion is optionally satisfied when the second part including movement in the region occurs after the first part (e.g., without the contact lifting off from the touch-sensitive display). In some embodiments, the movement is characterized by a first speed and/or a first velocity of a touch contact on a touch-sensitive display. In some embodiments, when the movement includes the first speed and/or the first velocity, the electronic device corresponds the first speed and/or first velocity to a first scrubbing rate in a first direction (e.g., a forward direction, a fast-forward direction, a backward direction, or a rewind direction). For example, the electronic device 500 optionally corresponds the movement of a contact characterized by a first speed in a left-ward direction (e.g., a swipe left) to the first scrubbing rate in the forward direction of the content item (e.g., a fast-forward direction), whereby the first scrubbing rate is proportional to the first speed and/or the first velocity, as illustrated in FIGS. 6I, 6J. Similarly, the electronic device optionally corresponds movement of a contact characterized by a second speed in a rightward-ward direction (e.g., a swipe right) to a second scrubbing rate in the backward direction of the content item (e.g., a rewind direction), whereby the second scrubbing rate is proportional to the second speed and/or second velocity, as illustrated in FIGS.

6B, 6C. As such, the electronic device optionally determines a scrubbing rate for the scrubbing based on a magnitude of speed of movement of the contact, and determines a direction for the scrubbing based on a direction of the movement of the contact associated with the second part of the input for scrubbing through the content item. In some embodiments, scrubbing through the content item is initiated while movement in the region is occurring (e.g., while the electronic device is detecting the second part of the input), as illustrated in FIGS. 6B, 6C. For example, the electronic device optionally actively assigns a scrubbing rate to the content item based on the movement in the region, as illustrated in FIGS. 6B, 6C. For example, during a touch swipe lasting 3 seconds, the speed associated with the second part of the input optionally includes a first speed during the first two seconds of the three second touch swipe, and the speed associated with the second part of the input optionally also includes a second speed during the last one second of the three second touch swipe. The electronic device (e.g., an application native to an operating system of the electronic device and or downloaded unto the electronic device) optionally scrubs the content item based on the first speed during the first two seconds of the three second touch swipe, and scrubs the content item based on the second speed during the last one second of the three-second touch swipe. In some embodiments, during scrubbing, playback of the content item is ceased, in addition to audio corresponding to the content item. Scrubbing through a content item in accordance with movement of an input directed to a region corresponding to a portion of a user interface that does not include a scrubber bar reduces steps involved for a user to initiate scrubbing of the content item.

In some embodiments, the content item is displayed at a first size ((e.g., a first length and a first width) and at a first position of the content item in the user interface and/or display area of the display generation component) when the input for scrubbing through the content item is received, such as the size of the display of the content item 602 in FIG. 6A, and scrubbing through the content item in accordance with the movement in the region includes visually animating scrubbing through the content item at the first size, such as the size of the display of the content item 602 in FIG. 6B (e.g., displaying the frames of the content item at the first size that are being scrubbed through). In some embodiments, the first size (e.g., are occupied by the content item in the display area of the display generation component) and/or first position of the content item relative to the user interface is maintained (e.g., at the size and/or position the content item had before the scrubbing input was received) while scrubbing through the content item. In some embodiments, during scrubbing of the content item, the display generation component displays frames of the content item that are being scrubbed, at the first size. For example, if the scrubbing of the content item includes scrubbing through 100 frames, the display generation component optionally displays up to 101 frames, corresponding to the scrubbing operation. The displayed frames associated with the scrubbing (e.g., the up to 101 frames) are optionally displayed at the first size in the same position and/or area as the display of the content item. In some embodiments, the content item is displayed as full screen content or partial screen content (e.g., a video within a web page including the video and other content, such as text, or a picture-in-picture video overlaid on a user interface such as a home screen user interface of the device). When the content item is displayed full-screen, the electronic device optionally visually animates scrubbing the content such that the scrubbing operation is displayed full-screen.

When the content is not full-screen content, the electronic device optionally visually animates scrubbing through the content item such that the scrubbing operation is displayed in the display area of the content item. Visually animating scrubbing through the content item at the size of the content item that the content item had before the scrubbing operation was initiated maintains consistency of presentation of the content item, thus reducing errors in usage.

In some embodiments, scrubbing through the content item in accordance with the movement in the region is based on a length (e.g., number of frames and/or time length) of the content item, such as illustrated with scrubbing through the content item 602 in FIGS. 6B-6D and scrubbing through the content item 603 in FIG. 6P and the graph 660 of FIG. 6R. In some embodiments, given the same input for scrubbing through the content (and optionally the same frame rate of display of the content item), a longer length of a content item causes the content item to be scrubbed at a faster rate than a scrubbing rate of a shorter length of a second content item. Also, in some embodiments, two content items having the same number of frames and/or time length are scrubbed at the same scrubbing rate, upon application of the same input. Scrubbing through the content item in accordance with the movement in the region based on a length of the content item allows for more precise scrubbing of the content item.

In some embodiments, the display generation component (and/or the one or more input devices) includes a touch-sensitive display, and the input for scrubbing through the content item includes a touch swipe input (e.g., an input corresponding to a swipe of a user's finger or hand) detected at a location on the touch-sensitive display corresponding to a display area of the content item, such as described with reference to the display generation component 504, the touch-sensitive surface 451, and the touch contact 608a and movement thereof, of FIG. 6B (e.g., a region of the touch-sensitive display that is on top of pixels emitting light of the content of the content item and/or in the area of the touch-sensitive display that is consumed by the content item, and not in an area of the touch-sensitive display that is not consumed by the content item (e.g., the black bars above and/or below the content item)). The touch swipe input optionally satisfies the one or more first criteria (e.g., the scrubbing criteria) discussed above. In some embodiments, the location on the touch sensitive display that corresponds to the display area of the content item includes any area of the touch-sensitive display that is consumed by display of the content item. In some embodiments, the display area of the content item includes a display area of a scrubber bar or timeline bar corresponding to the content item. Scrubbing through the content item in response to receiving a touch swipe detected at a location on the touch-sensitive display corresponding to a display area of the content item increases an amount of suitable locations from which input for scrubbing can be detected.

In some embodiments, the display generation component (and/or the one or more input devices) includes a touch-sensitive display, and wherein the input for scrubbing through the content item includes a touch swipe input (e.g., an input corresponding to a swipe of a user's finger or hand) detected at a location on the touch-sensitive display that does not correspond to a display area of the content item, such as described with reference to the display generation component 504, the touch-sensitive surface 451, and the touch contact 608a and movement thereof, of FIG. 6B (e.g., the black bars above and/or below the content item). The touch swipe input optionally satisfies the one or more first criteria (e.g., the scrubbing criteria) discussed above. In some embodiments, the location on the touch sensitive display that does not correspond to the display area of the content item corresponds to any area on the touch-sensitive display that is not consumed by display of the content item. In some embodiments, the display area of the content item includes a display area of a scrubber bar or timeline bar corresponding to the content item. Scrubbing through the content item in response to receiving a touch swipe detected at a location on the touch-sensitive display that does not correspond to a display area of the content item increases an amount of suitable locations from which input for scrubbing can be detected.

In some embodiments, the display generation component (and/or optionally the one or more input devices) includes a touch-sensitive display, the input for scrubbing through the content item includes a touch swipe input (e.g., an input corresponding to a swipe of a user's finger or hand) detected at a location on the touch-sensitive display, and the scrubbing in accordance with the movement in the region is performed independent of a location at which the first part of the input (e.g., initial touch down of a contact performing the swipe input) was detected on the touch-sensitive display, such as described with reference to the display generation component 504, the touch-sensitive surface 451, the touch contact 608a and movement thereof, and the scrubbing rate 606b, of FIG. 6B. For example, a swipe input detected having a first set of characteristics (e.g., a speed of movement on the touch-sensitive display and/or time duration on the touch-sensitive display) optionally results in the same amount of scrubbing anywhere on the touch-sensitive display (e.g., above, on, and/or below the display area of the content item) that the swipe input is detected. In some embodiments, the content item is not full screen content (e.g., the content item is partial screen content) and the display generation component concurrently displays second content optionally in a second user interface different from the user interface (e.g., the content item is embedded with other content in a (scrollable) user interface). In some embodiments, the one or more first criteria (e.g., the scrubbing criteria) includes a criterion that the input for scrubbing through the content item includes a direction in which the user interface is not scrollable for the input for scrubbing through the content item to cause scrubbing through the content item—otherwise the electronic device optionally scrolls through the second user interface instead of scrubbing through the content item. In some embodiments, the content item is Picture in Picture (PiP) content. For example, as PiP content, the content item is optionally included in a smaller application window that is optionally partially or fully covers a larger application window, different from the smaller application window. In some embodiments, the one or more first criteria (e.g., the scrubbing criteria) includes a criterion that the input for scrubbing through the content item includes a tap and hold on the PiP content—otherwise the PiP is optionally moved relative to the larger application window and the content item is optionally not scrubbed in response to the input. Scrubbing through the content item in accordance with the movement in the region and independent of the location at which the first part of the scrubbing input is detected reduces an amount of variables involved in determining a scrubbing rate for a content item for a given scrubbing input, thus increasing consistency in interaction with the device and reduction of errors in usage of the electronic device.

In some embodiments, the electronic device, in response to receiving the input for scrubbing through the content item, in accordance with a determination that the input for scrubbing through the content item satisfies one or more second criteria (e.g., skipping criteria), different from the one or more first criteria, skips through the content item by a predetermined amount, such as illustrated in the quick swipe 620 input of FIGS. 6F and 6G and the resulting skipping operation applied to the content item 602 in FIGS. 6F-6H (e.g., a predetermined amount of frames of the content item such as 20 frames, 200 frames, 2,000 frames ahead or behind a current playback position in the content item and/or a predetermined amount of time in the content item such as 10 s, 100 s, or 1,000 s ahead or behind of the current playback position of the content item). In some embodiments, the one or more second criteria includes a criterion that is satisfied when the movement of the second part of the input is a quick movement (e.g., a quick swipe). For example, the criterion is optionally satisfied when a speed of movement corresponding to and/or assigned to the second part of the input is above a threshold speed (e.g., 0.9 cm/s, 2 cm/s, 3 cm/s, 5 cm/s, 7 cm/s, or 10 cm/s). Additionally and/or alternatively, the criterion is optionally satisfied when a time duration corresponding to and/or assigned to the input and/or to specific parts of the input such as the second part of the input (e.g., a time span between touchdown of the contact on a touch-sensitive display and liftoff of the contact from the touch-sensitive display) is above a threshold time period (e.g., 0.4 s, 0.6 s, 0.8 s, 1 s, 1.321 s, or 3 s). Additionally and/or alternatively, the criterion is optionally satisfied when a distance corresponding to and/or assigned to the second part of the input (e.g., the distance of the movement of the contact between touchdown and liftoff) is below a threshold distance (e.g., 0.1 cm, 0.5 cm, 0.75 cm, 1 cm, or 1.125 cm). In response to determining that the one or more second criteria is satisfied, the electronic device optionally does not scrub through the content. Rather, the electronic device optionally performs a skipping operation including skipping through the content item by a predetermined amount as discussed above. Further, the direction of the skipping through the content item optionally corresponds to the direction of the swipe, directly or inversely. For example, when the direction of the skipping corresponds directly to the direction of the swipe, a swipe left that meets the one or more second criteria optionally results in a skip of content in a backward direction of the content item (e.g., in a rewind direction). As another example, when the direction of the skipping corresponds directly to the direction of the swipe, the swipe right that meets the one or more second criteria optionally results in a skip of content in a forward direction of the content item (e.g., in a fast-forward direction). As another example, when the direction of the skipping corresponds inversely to the direction of the swipe, the swipe left that meets the one or more second criteria optionally results in a skip of content in a forward direction of the content item (e.g., in the fast-forward direction). As another example, when the direction of the skipping corresponds inversely to the direction of the swipe, the swipe right that meets the one or more second criteria optionally results in a skip of content in a backward direction of the content item (e.g., in the rewind direction). Skipping through the content item by a predetermined amount in response to receiving the input for scrubbing through the content item and in accordance with the determination that the input for scrubbing through the content item satisfies the one or more second criteria allows a user to skip to a desired location within the content item without potentially less precise scrubbing the content item and decreases an amount of user inputs and time involved to display content at the desired location within the content item.

In some embodiments, a rate of scrubbing (e.g., a frame rate, an average or instantaneous rate of frames scrubbed per second, and/or an average or instantaneous rate of time period of the content item being scrubbing per second) through the content item in accordance with the movement in the region corresponds to (e.g., is proportional to) a speed of the movement in the region, such as illustrated in the scrubbing rate 606b and the scrubbing rate 606c in FIGS. 6B and 6C, respectively, and in the graph 650 of FIG. 6Q. For example, as the speed of movement of the input in the region increases up to a threshold speed (e.g., 0.9 cm/s, 2 cm/s, 3 cm/s, 5 cm/s, 7 cm/s, or 10 cm/s), the scrubbing rate optionally increases. Additionally, as a speed of movement in the region decreases within the threshold speed, the scrubbing rate optionally decreases. In some embodiments, the content item scrubbing technique includes no threshold speed. As such, in some embodiments, the faster the speed of the movement in the region, the faster the scrubbing rate for all types of speeds of the movement in the region. Corresponding a scrubbing rate to a speed of the movement in the region gives control over scrubbing rate without extra inputs.

In some embodiments, the electronic device, in response to detecting an end of the input for scrubbing through the content item (e.g., a liftoff of the touch contact from a touch-sensitive surface), gradually changes a rate of scrubbing (e.g., a frame rate, an average or instantaneous rate of frames scrubbed per second, and/or an average or instantaneous rate of time period of the content item being scrubbing per second) through the content item (e.g., increasing or decreasing smoothly, optionally at a constant rate) until the rate of scrubbing (e.g., a frame rate, an average or instantaneous rate of frames scrubbed per second, and/or an average or instantaneous rate of time period of the content item being scrubbing per second) reaches a playback speed associated with the content item, such as illustrated in the scrubbing rates 606c, 606d, 606e in FIGS. 6C-6E, respectively (e.g., the playback speed at which the content item was playing before the scrubbing input was received, such as 0.25×, 0.5×, 1×, 1.25×, 1.5×, or 2.0× or a pause of the content such as if the content item was not playing before the input was received). For example, in response to detecting liftoff of a touch contact that includes movement satisfies the one or more first criteria, the scrubbing rate optionally gradually decreases until the scrubbing rate reaches the playback speed associated with the content item. The rate of decrease optionally corresponds to a deceleration rate (e.g., a simulated deceleration rate due to simulated friction applied to the content item whenever the content item is scrubbed). As an example, the deceleration rate of the scrubbing is optionally (e.g., 5 frames per second per second (e.g., frames per second squared), 10 frames per second per second, 20 frames per second per second, or 40 frames per second per second). Other deceleration rates are possible. As such, the above recited range is for illustrative purposes and is non-limiting. As another example, when the scrubbing rate at the end of the input is less that the playback speed associated with the content item, gradually changing the rate of scrubbing optionally includes gradually increasing the rate of scrubbing until the rate of scrubbing reaches the playback speed associated with the content item. Gradually changing a rate of scrubbing through the content item until the rate of scrubbing reaches a playback speed associated with the content item in response to detecting an end of the input for scrubbing through the content item reduces an amount of inputs involved in scrubbing through the content item and reduces a time period involved in receiving the amount of inputs in order to sustain scrubbing through the content item.

In some embodiments, scrubbing through the content item in accordance with the movement in the region includes, in response to receiving the input for scrubbing through the content item, and in accordance with the determination that the input for scrubbing through the content item satisfies the one or more first criteria (e.g., the scrubbing criteria), in accordance with a determination that a length of the content item is a first length (e.g., a first number of total frames and/or a first time length), scrubbing through the content item at a first scrubbing rate (e.g., a frame rate, an average or instantaneous rate of frames scrubbed per second, and/or an average or instantaneous rate of time period of the content item being scrubbing per second), and in accordance with a determination that the length of the content item is a second length (e.g., a second number of total frames and/or a second time length), different from the first length, scrubbing through the content item at a second scrubbing rate (e.g., a frame rate, an average or instantaneous rate of frames scrubbed per second, and/or an average or instantaneous rate of time period of the content item being scrubbing per second), different from the first scrubbing rate, such as illustrated with scrubbing through the content item 602 in FIGS. 6B-6D and scrubbing through the content item 603 in FIG. 6P (e.g., a frame rate, an average or instantaneous rate of frames scrubbed per second, and/or an average or instantaneous rate of time period of the content item being scrubbing per second). For example, when the first length is smaller than the second length, the scrubbing through the content item of the first length optionally includes a lower scrubbing rate than the scrubbing rate of the scrubbing through the content item of the second length, larger than the first length. As such, in some embodiments, the content item scrubbing technique includes determining a scrubbing rate based on a content item length. Scrubbing through a first content item having a different content item length than a second content item length of a second content item configures scrubbing rates for content items based on content item lengths, reduces errors in content item scrubbing, and reduces an amount of scrubbing inputs for scrubbing through longer content items.

In some embodiments, in response to detecting an end of the input for scrubbing through the content item (e.g., a liftoff of the touch contact on a touch-sensitive surface such as touch-sensitive display of the one or more input devices), and in accordance with a determination that the input for scrubbing through the content item was moving (or was moving more than a threshold speed, such as 0.1 cm/s, 0.3 cm/s, 0.9 cm/s, 1.1 cm/s, 1.5 cm/s, or 1.932 cm/s) when the end of the input for scrubbing through the content item was detected (e.g., relative movement is detected between the touch contact and the touch-sensitive surface), the electronic device continues scrubbing through the content item, such as illustrated by the scrubbing rate 606d of FIG. 6D (e.g., not stopping scrubbing through the content item). In some embodiments, the movement of the input when the end of the input for scrubbing through the content item is detected corresponds to a relative lateral movement between the one or more input devices (e.g., the touch-sensitive surface 451) and the touch contact at the point of liftoff. In some embodiments, the first scrubbing rate resulting from a first relative lateral movement detected at the point of liftoff of the touch contact that is slower than a second relative lateral movement detected at the point of liftoff of the touch contact is optionally slower than a second scrubbing rate resulting from the second relative lateral movement. In some embodiments, a content item scrubbing technique includes assigning a content item a simulated mass based on a length of the content item and assigning the input for scrubbing through the content item a simulated force such that the simulated force applied to the simulated mass causes scrubbing through the content item so as to modify a simulated momentum of the display of frames of the content item from a rate of display of frames of the content item corresponding to a playback speed or a pause state to a different rate of display of frames of the content item (e.g., to the scrubbing rate). Thus, in some embodiments, the content item is scrubbed with simulated momentum based on the simulated mass of the content item. Continuing scrubbing through the content item in response to detecting an end of the input for scrubbing through the content item, and in accordance with a determination that the input for scrubbing through the content item was moving when the end of the input for scrubbing through the content item was detected reduces an amount of inputs involved in scrubbing through the content item and reduces a time period involved in receiving the amount of inputs in order to sustain scrubbing through the content item.

In some embodiments, in response to receiving the input for scrubbing through the content item, and in accordance with a determination that the input was not moving (or was moving less than the threshold speed, as will be described later below in this present disclosure) when the end of the input for scrubbing through the content item was detected (e.g., when a liftoff of the touch contact on a touch-sensitive surface such as touch-sensitive display of the one or more input devices was detected, no relative movement was detected between the touch contact and the touch-sensitive surface), the electronic device ceases the scrubbing through the content item (e.g., stopping scrubbing, abruptly) and resumes playback of the content item from a current playback position corresponding to the end of the input for scrubbing through the content item. For example, if no relative was detected between the touch contact 608a and the touch-sensitive surface 451 of FIG. 6C at the liftoff state, the electronic device optionally causes the scrubbing rate to go to zero and resumes the content item 602 for playback starting from frame 705 of the content item 602. In some embodiments, the movement of the input for scrubbing through the content item when the end of the input for scrubbing through the content item is detected corresponds to a relative movement between the one or more input devices and the touch contact, as discussed above. As such, when the end of the input is detected the content item scrubbing technique optionally includes scrubbing in accordance with satisfaction of a determination that relative movement between the one or more input devices and the touch contact. In response to satisfaction of a second determination that the relative movement between the one or more input devices and the touch contact is zero (e.g., zero in a lateral direction of the touch sensitive surface and the input) and/or below a threshold such as 0.01 cm/s, the electronic device optionally determines that the input was not moving when the end of the input is detected and resumes playback of the content item. Ceasing scrubbing through the content item and resuming playback of the content item from a current playback position corresponding to the end of the input for scrubbing through the content item in accordance with a determination that the input was not moving when the end of the input for scrubbing through the content item was detected increases user control of content item playback position control and reduces errors such as over-scrubbing errors.

In some embodiments, continuing the scrubbing through the content item includes changing a scrubbing rate (e.g., a frame rate, an average or instantaneous rate of frames scrubbed per second, and/or an average or instantaneous rate of time period of the content item being scrubbing per second) through the content item (e.g., increasing or decreasing the scrubbing rate) by a predefined rate (e.g., a constant or variable rate), such as illustrated by the change between the scrubbing rate 606d of FIG. 6D and the scrubbing rate 606e of FIG. 6E. In some embodiments, the scrubbing rate decreases or increases at a default rate or predetermined rate such as the deceleration rate discussed above (e.g., 5 frames per second per second (e.g., frames per second squared), 10 frames per second per second, 40 frames per second per second) after detecting the end of the input for scrubbing through the content item (e.g., liftoff of the touch contact from the touch-sensitive surface). Continuing scrubbing through the content item at a predefined rate reduces an amount of inputs involved in scrubbing through the content item and reduces a time period for which the amount of inputs is received for sustaining scrubbing through the content item.

In some embodiments, the content item is displayed via the display generation component at a first location in a display area of the display generation component (e.g., a first region of the touch-sensitive display including a first set of pixels emitting light of the content of the content item, or a first region of the display area of the display generation component), such as the content item area 601 of FIG. 6A. In some embodiments, while scrubbing through the content item, in accordance with a determination that one or more second criteria (e.g., shifting criteria including a criterion that a scrubbing rate is zero immediately before display of an end time position or edge frame of the content item), different from the one or more first criteria, are not satisfied, the electronic device displays the content item at the first location in the display area of the display generation component, such as the location of the right edge of the content item 602 in FIG. 6J (e.g., relative to the location of the first edge location 624 in FIG. 6K). In some embodiments, in accordance with a determination that the one or more second criteria are satisfied (e.g., shifting criteria including a criterion that display of the content item includes display of content of the content item corresponding to the end time position or end frame of the content item), the electronic device shifts the display of the content item to a second location, different from the first location, in the display area of the display generation component, such as the shift of the display of the content item 602 to the leftward direction in user interface 600k of FIG. 6K, as indicated by the representative arrow 622a (e.g., shifting the displayed content item to a second region of the touch-sensitive display including at least one pixel not in the first set of pixels). In some embodiments, the second location includes a portion of the first location. In some embodiments, the second location does not include a portion of the first location. In some embodiments, the shifting direction corresponds to the direction of the input. For example, in response to the direction of the input for scrubbing through the content item being a left swipe on a touch-sensitive surface, and the one or more second criteria being satisfied, the content item scrubbing technique optionally includes shifting the display in the left direction. Similarly, as another example, in response to the direction of the input for scrubbing through the content item being a right swipe on the touch-sensitive surface, and the one or more second criteria being satisfied, the content item scrubbing technique optionally includes shifting the display in the right direction. In some embodiments, the shifting direction inversely relates to the direction of the input. For example, in response to the direction of the input for scrubbing through the content item being a left swipe on the touch-sensitive surface, and the one or more second criteria being satisfied, the content item scrubbing technique optionally includes shifting the display in the right direction. Similarly, as another example, in response to the direction of the input for scrubbing through the content item being a right swipe on the touch-sensitive surface, and the one or more second criteria being satisfied, the content item scrubbing technique optionally includes shifting the display in the left direction. After shifting to the second location, the display of the content item optionally shifts back to the first location, as if rubber-banding back to its original location. Visually shifting the content item in response to the one or more second criteria provides an alert to a user of a playback position within the content item, thus reducing errors related to determining a location of the current playback position within the content item.

In some embodiments, while scrubbing through the content item in accordance with the movement in the region at a first scrubbing rate, such as the scrubbing rate 606i of FIG. 6I (e.g., a frame rate, an average or instantaneous rate of frames scrubbed per second, and/or an average or instantaneous rate of time period of the content item being scrubbing per second), the electronic device receives, via the one or more input devices (e.g., a touch sensitive surface), a second input for scrubbing through the content item (e.g., a second swipe on the touch sensitive surface at a time after liftoff of a first swipe on the touch sensitive surface corresponding to the current scrubbing), such as illustrated by the touch contact 608d and movement thereof in FIG. 6J. In some embodiments, in response to receiving the second input for scrubbing through the content item, and in accordance with a determination that the second input for scrubbing through the content item satisfies the one or more first criteria (e.g., the scrubbing criteria) the electronic device scrubs through the content item at a second scrubbing rate (e.g., a frame rate, an average or instantaneous rate of frames scrubbed per second, and/or an average or instantaneous rate of time period of the content item being scrubbing per second), faster than the first scrubbing rate, such as illustrated by the scrubbing rate 606j in FIG. 6J (e.g., a frame rate, an average or instantaneous rate of frames scrubbed per second, and/or an average or instantaneous rate of time period of the content item being scrubbing per second). For example, the input for scrubbing through the content item and the second input for scrubbing through the content item optionally include a direction (e.g., a leftward, right ward, and/or cardinal direction) such as a direction of movement. When the second input for scrubbing includes a similar or same direction as the input, the content item scrubbing technique optionally includes scrubbing through the content item faster in the same direction (e.g., fast-forward or rewind direction) in the content item. The increase in scrubbing rate is optionally proportional to the speed of movement of the second swipe and/or amount of movement of the second swipe. When the second swipe is in the opposite direction of the first swipe and/or a corresponding existing scrubbing direction, the scrubbing rate optionally decreases, goes to zero, or switches scrubbing direction based on the speed of movement of the second swipe and/or amount of movement of the second swipe. Receiving a second input for scrubbing through the content item while scrubbing at a first scrubbing rate and scrubbing through the content item at a second scrubbing rate, faster than the first scrubbing rate, in response to receiving the second input increases user control of content scrubbing speed and reduces errors such as under-scrubbing errors.

In some embodiments, scrubbing through the content item in accordance with the movement in the region includes, in accordance with a determination that a speed of the movement in the region is below a threshold speed (e.g., 0.2 cm/s, 0.5 cm/s, 1 cm/s or 2 cm/s), scrubbing through the content item on a frame-by-frame basis (e.g., visually displaying each frame scrubbed through in a scrubbing operation). In some embodiments, frame-by-frame scrubbing includes moving from one frame to an adjacent frame in the content item per unit movement of the input (e.g., 0.06 cm, 0.09 cm, 0.11 cm, 0.3 cm, or 0.4 cm), such as discussed above with reference to the scrubbing operation illustrated in FIGS. 6A-6E. In some embodiments, scrubbing through the content item in accordance with the movement in the region includes in accordance with a determination that the speed of the movement in the region is above the threshold speed, scrubbing through the content item on a plurality of frames-by-plurality of frames basis, such as discussed above with reference to the scrubbing operation illustrated in FIGS. 6A-6E (e.g., visually displaying less than each frame scrubbed through in a scrubbing operation). In some embodiments, plurality of frames-by-plurality of frames scrubbing includes moving from one frame to a frame X frames away from (e.g., before or after, depending on the direction of scrubbing) the one frame per unit of movement of the input (e.g., 2, 10, 100, or 500 frames in the content item per unit movement). In some embodiments, when the speed of the movement in the region is above the threshold speed, the faster the speed of the movement, the greater the plurality of frames-by-plurality of frames basis by which the content item is scrubbed per unit of movement of the input. In some embodiments, the content item scrubbing technique includes visually displaying up to a total amount of frames scrubbed between a first time during a scrubbing period and a second during the scrubbing period, after the first time. Additionally or alternatively, the basis by which the scrubbing through the content item is determined is optionally based on a length of the content item (e.g., a number of frames of the content item). For example, given the same input for scrubbing applied to a first content item and a second content item, when the content item is longer than the second content item, the content item scrubbing technique optionally includes displaying a fewer number of frames (e.g., scrubbing through the content item on the plurality of frames-by-plurality of frames basis) during a scrubbing period than when a second content item shorter than the first content item receives the same input. Scrubbing through the content item on a basis that is in accordance with a determination of a speed of movement in the region relative to a threshold speed allows for more precise scrubbing based on input.

In some embodiments, scrubbing through the content item in accordance with the movement in the region includes, in accordance with a determination that the network connection speed (e.g., a bandwidth size and/or bandwidth availability in a wired or wireless Internet connection) of the electronic device is a first speed, such as the network connection speed 626a of FIG. 6M, scrubbing through the content item at a first scrubbing rate, such as the scrubbing rate 606m in FIG. 6M (e.g., a frame rate, an average or instantaneous rate of frames scrubbed per second, and/or an average or instantaneous rate of time period of the content item being scrubbing per second), and in accordance with a determination that the network connection speed of the electronic device is a second speed, different from the first speed, such as the network connection speed 626*b* of FIG. 6N, scrubbing through the content item at a second scrubbing rate (e.g., a frame rate, an average or instantaneous rate of frames scrubbed per second, and/or an average or instantaneous rate of time period of the content item being scrubbing per second), different than the first scrubbing rate, such as the scrubbing rate 606*n* of FIG. 6N (e.g., a frame rate, an average or instantaneous rate of frames scrubbed per second, and/or an average or instantaneous rate of time period of the content item being scrubbing per second). The scrubbing speed is optionally based on the network connection speed. For example, given the same input and/or same content length, a first content item on an electronic device that has a first network connection speed, faster than a second network connection speed, is optionally scrubbed faster than the first content item on an electronic device having the second network connection speed, slower than the first network connection speed. The network connection speed is optionally the connection over which the content item is being received/streamed by the electronic device. Scrubbing through the content item at a rate determined by a network connection speed of the electronic device reduces processing errors in the electronic device (e.g., reduces crash possibility) during scrubbing of the electronic device and avoids imprecision in scrubbing resulting from irregular or jerky scrubbing through the content item.

In some embodiments, while scrubbing through the content item in accordance with the movement in the region, the electronic device displays the scrubber bar or a timeline bar corresponding to the content item that indicates a current playback position (e.g., a playback time position) in the content item, such as illustrated by the scrubber bar 616 in FIG. 6B. In some embodiments, the scrubber bar is not displayed before the second part of the input is detected and/or when the input for scrubbing through the content item is received. In some embodiments, the scrubber bar continues to be displayed after detecting an end of the input for scrubbing through the content item (e.g., liftoff of a touch contact from a touch-sensitive surface). In some embodiments, the first and/or second part of the input is detected on the scrubber bar or the timeline bar. It should be noted that touchdown on the scrubber bar or the timeline bar and/or movement in the scrubber bar or the timeline bar is optionally not on a current playback position indicator in the scrubber bar or the timeline bar. Indeed, the touchdown on the scrubber bar or the timeline bar and/or movement in the scrubber bar or the timeline bar is optionally detected anywhere on the scrubber bar or the timeline bar. In some embodiments, the scrubber bar ceases display in response to an end of the scrubbing. In some embodiments, a second input for scrubbing through the content item is received on the scrubber bar during a scrubbing period associated with the first input for scrubbing through the content item. Displaying the scrubber bar or timeline bar during scrubbing of the content item allows a user to visualize a location within content item to which the currently displayed frame corresponds.

In some embodiments, when the input for scrubbing through the content item is detected, the electronic device displays, via the display generation component, one or more playback controls that are selectable to control playback of the content item (e.g., a pause control icon, a play control icon, a fast-forward control icon, and/or a rewind control icon), such as illustrated by the playback controls 630 of FIG. 6O, and while scrubbing through the content item in accordance with the movement in the region, the electronic device ceases display of the one or more playback controls, such as illustrated by the user interface 600*p* of FIG. 6P. In some embodiments, the one or more playback controls are displayed before detection of the input for scrubbing through the content item and/or before detection of the first part of the input. In some embodiments, the one or more playback controls continue to not be displayed after detecting an end of the input for scrubbing through the content item (e.g., liftoff of a touch contact from a touch-sensitive surface). In some embodiments, the one or more playback controls are displayed on and/or off the portion of the display generation component displaying the user interface including the content item and/or on and/or off the portion of the display generation component displaying the content item specifically. In some embodiments, the input for scrubbing through the content item is detected (e.g., received) on and/or over the one or more playback controls. In some embodiments, if the one or more playback controls were displayed when the scrubbing input was received, the one or more playback controls are automatically (e.g., without user input) redisplayed after the scrubbing rate reaches the playback speed of the content item and/or a pause. In some embodiments, if the one or more playback controls weren't displayed when the scrubbing input was received, the one or more playback controls optionally remain not displayed after the scrubbing. Ceasing display of the one or more playback controls while scrubbing through the content item reduces a number of visual elements displayed via the display generation component and reduces errors in navigating the display during a scrubbing period.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 7 are, optionally, implemented by components depicted in FIGS. 1A-1B. For example, receiving operation 702*c* and scrubbing operation 702*f* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to enhance the ability of users to scrub through a content item that, for example, is optionally displayed on an electronic device owned by the users. The present disclosure contemplates that in some instances, the data utilized may include personal information data that uniquely identifies or can be used to contact or locate a specific person. Such personal information data can include demographic data, content consumption activity, location-based data, telephone numbers, email addresses, TWITTER ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, content item consumption activity can be used to suggest content to a user and/or a content item scrubbing technique can be used to help a user scrub to content that the user desires to watch on an electronic device. Accordingly, use of such personal information data enables users to use electronic devices in coordinated manners. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of network services, the present technology can be configured to allow users to select to "opt in" or "opt out" of participation in the collection of personal information data during registration for services or anytime thereafter. In another example, users can select not to enable content consumption activity tracking. In addition to providing "opt in" and "opt out" options, the present disclosure contemplates providing notifications relating to the access or use of personal information. For instance, a user may be notified upon initiating content playback and/or a content item scrubbing technique that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content item and other user interfaces can be scrubbed and/or navigated in accordance with the embodiments of the disclosure without tracking the content consumption activity of the user.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at an electronic device in communication with a display generation component and one or more input devices:

displaying, via the display generation component, a user interface including a content item;

while displaying the user interface including the content item:

receiving, via the one or more input devices, an input for scrubbing through the content item, wherein the input for scrubbing through the content item includes:

a first part, including a touchdown of a touch contact, directed to a region corresponding to a portion of the user interface that does not include a scrubber bar; and a second part including movement of the touch contact in a first direction in the region, and lift-off of the touch contact during the movement of the touch contact; and in response to receiving the input for scrubbing through the content item, and in accordance with a determination that the input for scrubbing through the content item satisfies one or more first criteria, scrubbing through the content item with a first scrubbing rate in a first content direction, including visually animating scrubbing through the content item, in accordance with the movement in the region;

while scrubbing through the content item with the first scrubbing rate in the first content direction, receiving, via the one or more input devices, a second input for scrubbing through the content item; and in response to receiving the second input for scrubbing through the content item:

in accordance with a determination that the second input for scrubbing through the content item satisfies the one or more first criteria, including a requirement that is satisfied when the second input for scrubbing though the content item corresponds to a request to scrub through the content item in the first content direction:

scrubbing through the content item in the first content direction, including visually animating scrubbing through the content item, at a second scrubbing rate, faster than the first scrubbing rate.

2. The method of claim 1, wherein the content item is displayed at a first size when the input for scrubbing through the content item is received, and wherein scrubbing through the content item in accordance with the movement in the region includes visually animating scrubbing through the content item at the first size.

3. The method of claim 1, wherein scrubbing through the content item in accordance with the movement in the region is based on a length of the content item.

4. The method of claim 1, wherein the display generation component includes a touch-sensitive display, and wherein the input for scrubbing through the content item includes a touch swipe input detected at a location on the touch-sensitive display corresponding to a display area of the content item.

5. The method of claim 1, wherein the display generation component includes a touch-sensitive display, and wherein the input for scrubbing through the content item includes a touch swipe input detected at a location on the touch-sensitive display that does not correspond to a display area of the content item.

6. The method of claim 1, wherein the display generation component includes a touch-sensitive display, wherein the input for scrubbing through the content item includes a touch swipe input detected at a location on the touch-sensitive display, and wherein the scrubbing in accordance with the movement in the region is performed independent of a location at which the first part of the input was detected on the touch-sensitive display.

7. The method of claim 1, comprising:

in response to receiving the input for scrubbing through the content item:

in accordance with a determination that the input for scrubbing through the content item satisfies one or more second criteria, different from the one or more first criteria, skipping through the content item by a predetermined amount.

8. The method of claim 1, wherein a rate of scrubbing through the content item in accordance with the movement in the region corresponds to a speed of the movement in the region.

9. The method of claim 1, comprising:

in response to detecting an end of the input for scrubbing through the content item, gradually changing a rate of scrubbing through the content item until the rate of scrubbing reaches a playback speed associated with the content item.

10. The method of claim 1, wherein scrubbing through the content item in accordance with the movement in the region includes:

in response to receiving the input for scrubbing through the content item, and in accordance with the determination that the input for scrubbing through the content item satisfies the one or more first criteria:

in accordance with a determination that a length of the content item is a first length, scrubbing through the content item at a first scrubbing rate; and in accordance with a determination that the length of the content item is a second length, different from the first length, scrubbing through the content item at a second scrubbing rate, different from the first scrubbing rate.

11. The method of claim 1, comprising:

in response to detecting an end of the input for scrubbing through the content item, and in accordance with a determination that the input for scrubbing through the content item was moving when the end of the input for scrubbing through the content item was detected, continuing scrubbing through the content item.

12. The method of claim 11, comprising:

in response to receiving the input for scrubbing through the content item, and in accordance with a determination that the input was not moving when the end of the input for scrubbing through the content item was detected, ceasing the scrubbing through the content item and resuming playback of the content item from a current playback position corresponding to the end of the input for scrubbing through the content item.

13. The method of claim 11, wherein continuing the scrubbing through the content item includes changing a scrubbing rate through the content item by a predefined rate.

14. The method of claim 1, wherein the content item is displayed via the display generation component at a first location in a display area of the display generation component, and wherein the method comprises:

while scrubbing through the content item:

in accordance with a determination that one or more second criteria, different from the one or more first criteria, are not satisfied, displaying the content item at the first location in the display area of the display generation component; and in accordance with a determination that the one or more second criteria are satisfied, shifting the display of the content item to a second location, different from the first location, in the display area of the display generation component.

15. The method of claim 1, wherein scrubbing through the content item in accordance with the movement in the region includes:

in accordance with a determination that a speed of the movement in the region is below a threshold speed, scrubbing through the content item on a frame-by-frame basis; and in accordance with a determination that the speed of the movement in the region is above the threshold speed, scrubbing through the content item on a plurality of frames-by-plurality of frames basis.

16. The method of claim 1, wherein scrubbing through the content item in accordance with the movement in the region includes:

in accordance with a determination that a network connection speed of the electronic device is a first speed, scrubbing through the content item at a first scrubbing rate; and in accordance with a determination that the network connection speed of the electronic device is a second speed, different from the first speed, scrubbing through the content item at a second scrubbing rate, different than the first scrubbing rate.

17. The method of claim 1, comprising:

while scrubbing through the content item in accordance with the movement in the region, displaying the scrubber bar or a timeline bar corresponding to the content item that indicates a current playback position in the content item.

18. The method of claim 17, comprising:

when the input for scrubbing through the content item is detected, displaying, via the display generation component, one or more playback controls that are selectable to control playback of the content item; and while scrubbing through the content item in accordance with the movement in the region, ceasing display of the one or more playback controls.

19. The method of claim 17, wherein the scrubber bar or the timeline bar is not displayed when the input for scrubbing through the content item is received.

20. The method of claim 1, wherein the input for scrubbing through the content item is received via a touch-sensitive display of the one or more input devices, and wherein scrubbing through the content item in accordance with the movement in the region includes:

in accordance with a determination that the input for scrubbing through the content item was directed to a first region of the touch-sensitive display, scrubbing through the content item with a first scrubbing rate; and in accordance with a determination that the input for scrubbing through the content item was directed to a second region, different from the first region, of the touch-sensitive display, scrubbing through the content item with a second scrubbing rate, different from the first scrubbing rate.

21. An electronic device, comprising:

one or more processors;

memory; and one or more programs, wherein the one or more programs are stored in the memory and configured to be executed by the one or more processors, the one or more programs including instructions for:

displaying, via a display generation component, a user interface including a content item;

while displaying the user interface including the content item:

receiving, via one or more input devices, an input for scrubbing through the content item, wherein the input for scrubbing through the content item includes:

a first part, including a touchdown of a touch contact, directed to a region corresponding to a portion of the user interface that does not include a scrubber bar; and a second part including movement of the touch contact in a first direction in the region, and lift-off of the touch contact during the movement of the touch contact; and in response to receiving the input for scrubbing through the content item, and in accordance with a determination that the input for scrubbing through the content item satisfies one or more first criteria, scrubbing through the content item with a first scrubbing rate in a first content direction, including visually animating scrubbing through the content item, in accordance with the movement in the region;

while scrubbing through the content item with the first scrubbing rate in the first content direction, receiving, via the one or more input devices, a second input for scrubbing through the content item; and in response to receiving the second input for scrubbing through the content item:

in accordance with a determination that the second input for scrubbing through the content item satisfies the one or more first criteria, including a requirement that is satisfied when the second input for scrubbing though the content item corresponds to a request to scrub through the content item in the first content direction:

scrubbing through the content item in the first content direction, including visually animating scrubbing through the content item, at a second scrubbing rate, faster than the first scrubbing rate.

22. A non-transitory computer readable storage medium storing one or more programs, the one or more programs comprising instructions, which when executed by one or more processors of an electronic device, cause the electronic device to perform a method comprising:

displaying, via a display generation component, a user interface including a content item;

while displaying the user interface including the content item:

receiving, via one or more input devices, an input for scrubbing through the content item, wherein the input for scrubbing through the content item includes:

a first part, including a touchdown of a touch contact, directed to a region corresponding to a portion of the user interface that does not include a scrubber bar; and a second part including movement of the touch contact in a first direction in the region, and lift-off of the touch contact during the movement of the touch contact; and in response to receiving the input for scrubbing through the content item, and in accordance with a determination that the input for scrubbing through the content item satisfies one or more first criteria, scrubbing through the content item with a first scrubbing rate in a first content direction, including visually animating scrubbing through the content item, in accordance with the movement in the region;

while scrubbing through the content item with the first scrubbing rate in the first content direction, receiving, via the one or more input devices, a second input for scrubbing through the content item; and in response to receiving the second input for scrubbing through the content item:

in accordance with a determination that the second input for scrubbing through the content item satisfies the one or more first criteria, including a requirement that is satisfied when the second input for scrubbing though the content item corresponds to a request to scrub through the content item in the first content direction:

scrubbing through the content item in the first content direction, including visually animating scrubbing through the content item, at a second scrubbing rate, faster than the first scrubbing rate.

23. The method of claim 1, wherein the second input for scrubbing through the content item includes a first part directed to the region corresponding to the portion of the user interface that does not include the scrubber bar.

24. The electronic device of claim 21, wherein the content item is displayed at a first size when the input for scrubbing through the content item is received, and wherein scrubbing through the content item in accordance with the movement in the region includes visually animating scrubbing through the content item at the first size.

25. The electronic device of claim 21, wherein scrubbing through the content item in accordance with the movement in the region is based on a length of the content item.

26. The electronic device of claim 21, wherein the display generation component includes a touch-sensitive display, and wherein the input for scrubbing through the content item includes a touch swipe input detected at a location on the touch-sensitive display corresponding to a display area of the content item.

27. The electronic device of claim 21, wherein the display generation component includes a touch-sensitive display, and wherein the input for scrubbing through the content item includes a touch swipe input detected at a location on the touch-sensitive display that does not correspond to a display area of the content item.

28. The electronic device of claim 21, wherein the display generation component includes a touch-sensitive display, wherein the input for scrubbing through the content item includes a touch swipe input detected at a location on the touch-sensitive display, and wherein the scrubbing in accordance with the movement in the region is performed independent of a location at which the first part of the input was detected on the touch-sensitive display.

29. The electronic device of claim 21, wherein the one or more programs further include instructions for:

in response to receiving the input for scrubbing through the content item:

in accordance with a determination that the input for scrubbing through the content item satisfies one or more second criteria, different from the one or more first criteria, skipping through the content item by a predetermined amount.

30. The electronic device of claim 21, wherein a rate of scrubbing through the content item in accordance with the movement in the region corresponds to a speed of the movement in the region.

31. The electronic device of claim 21, wherein the one or more programs further include instructions for:

in response to detecting an end of the input for scrubbing through the content item, gradually changing a rate of scrubbing through the content item until the rate of scrubbing reaches a playback speed associated with the content item.

32. The electronic device of claim 21, wherein scrubbing through the content item in accordance with the movement in the region includes:

in response to receiving the input for scrubbing through the content item, and in accordance with the determination that the input for scrubbing through the content item satisfies the one or more first criteria:

in accordance with a determination that a length of the content item is a first length, scrubbing through the content item at a first scrubbing rate; and in accordance with a determination that the length of the content item is a second length, different from the first length, scrubbing through the content item at a second scrubbing rate, different from the first scrubbing rate.

33. The electronic device of claim 21, wherein the one or more programs further include instructions for:

in response to detecting an end of the input for scrubbing through the content item, and in accordance with a determination that the input for scrubbing through the content item was moving when the end of the input for scrubbing through the content item was detected, continuing scrubbing through the content item.

34. The electronic device of claim 33, wherein the one or more programs further include instructions for:

in response to receiving the input for scrubbing through the content item, and in accordance with a determination that the input was not moving when the end of the input for scrubbing through the content item was detected, ceasing the scrubbing through the content item and resuming playback of the content item from a current playback position corresponding to the end of the input for scrubbing through the content item.

35. The electronic device of claim 33, wherein continuing the scrubbing through the content item includes changing a scrubbing rate through the content item by a predefined rate.

36. The electronic device of claim 21, wherein the content item is displayed via the display generation component at a first location in a display area of the display generation component, and wherein the one or more programs further include instructions for:

while scrubbing through the content item:

in accordance with a determination that one or more second criteria, different from the one or more first criteria, are not satisfied, displaying the content item at the first location in the display area of the display generation component; and in accordance with a determination that the one or more second criteria are satisfied, shifting the display of the content item to a second location, different from the first location, in the display area of the display generation component.

37. The electronic device of claim 21, wherein scrubbing through the content item in accordance with the movement in the region includes:

in accordance with a determination that a speed of the movement in the region is below a threshold speed, scrubbing through the content item on a frame-by-frame basis; and in accordance with a determination that the speed of the movement in the region is above the threshold speed, scrubbing through the content item on a plurality of frames-by-plurality of frames basis.

38. The electronic device of claim 21, wherein scrubbing through the content item in accordance with the movement in the region includes:

in accordance with a determination that a network connection speed of the electronic device is a first speed, scrubbing through the content item at a first scrubbing rate; and in accordance with a determination that the network connection speed of the electronic device is a second speed, different from the first speed, scrubbing through the content item at a second scrubbing rate, different than the first scrubbing rate.

39. The electronic device of claim 21, wherein the one or more programs further include instructions for:

while scrubbing through the content item in accordance with the movement in the region, displaying the scrubber bar or a timeline bar corresponding to the content item that indicates a current playback position in the content item.

40. The electronic device of claim 39, wherein the one or more programs further include instructions for:

when the input for scrubbing through the content item is detected, displaying, via the display generation component, one or more playback controls that are selectable to control playback of the content item; and while scrubbing through the content item in accordance with the movement in the region, ceasing display of the one or more playback controls.

41. The electronic device of claim 39, wherein the scrubber bar or the timeline bar is not displayed when the input for scrubbing through the content item is received.

42. The electronic device of claim 21, wherein the input for scrubbing through the content item is received via a touch-sensitive display of the one or more input devices, and wherein scrubbing through the content item in accordance with the movement in the region includes:

in accordance with a determination that the input for scrubbing through the content item was directed to a first region of the touch-sensitive display, scrubbing through the content item with a first scrubbing rate; and in accordance with a determination that the input for scrubbing through the content item was directed to a second region, different from the first region, of the touch-sensitive display, scrubbing through the content item with a second scrubbing rate, different from the first scrubbing rate.

43. The electronic device of claim 21, wherein the second input for scrubbing through the content item includes a first part directed to the region corresponding to the portion of the user interface that does not include the scrubber bar.

44. The non-transitory computer readable storage medium of claim 22, wherein the content item is displayed at a first size when the input for scrubbing through the content item is received, and wherein scrubbing through the content item in accordance with the movement in the region includes visually animating scrubbing through the content item at the first size.

45. The non-transitory computer readable storage medium of claim 22, wherein scrubbing through the content item in accordance with the movement in the region is based on a length of the content item.

46. The non-transitory computer readable storage medium of claim 22, wherein the display generation component includes a touch-sensitive display, and wherein the input for scrubbing through the content item includes a touch swipe input detected at a location on the touch- sensitive display corresponding to a display area of the content item.

47. The non-transitory computer readable storage medium of claim 22, wherein the display generation component includes a touch-sensitive display, and wherein the input for scrubbing through the content item includes a touch swipe input detected at a location on the touch- sensitive display that does not correspond to a display area of the content item.

48. The non-transitory computer readable storage medium of claim 22, wherein the display generation component includes a touch-sensitive display, wherein the input for scrubbing through the content item includes a touch swipe input detected at a location on the touch-sensitive display, and wherein the scrubbing in accordance with the movement in the region is performed independent of a location at which the first part of the input was detected on the touch-sensitive display.

49. The non-transitory computer readable storage medium of claim 22, further storing instructions which, when executed by the one or more processors, further cause the electronic device to perform:

in response to receiving the input for scrubbing through the content item:

in accordance with a determination that the input for scrubbing through the content item satisfies one or more second criteria, different from the one or more first criteria, skipping through the content item by a predetermined amount.

50. The non-transitory computer readable storage medium of claim 22, wherein a rate of scrubbing through the content item in accordance with the movement in the region corresponds to a speed of the movement in the region.

51. The non-transitory computer readable storage medium of claim 22, further storing instructions which, when executed by the one or more processors, further cause the electronic device to perform:

in response to detecting an end of the input for scrubbing through the content item, gradually changing a rate of scrubbing through the content item until the rate of scrubbing reaches a playback speed associated with the content item.

52. The non-transitory computer readable storage medium of claim 22, wherein scrubbing through the content item in accordance with the movement in the region includes:

in response to receiving the input for scrubbing through the content item, and in accordance with the determination that the input for scrubbing through the content item satisfies the one or more first criteria:

in accordance with a determination that a length of the content item is a first length, scrubbing through the content item at a first scrubbing rate; and in accordance with a determination that the length of the content item is a second length, different from the first length, scrubbing through the content item at a second scrubbing rate, different from the first scrubbing rate.

53. The non-transitory computer readable storage medium of claim 22, further storing instructions which, when executed by the one or more processors, further cause the electronic device to perform:

in response to detecting an end of the input for scrubbing through the content item, and in accordance with a determination that the input for scrubbing through the content item was moving when the end of the input for scrubbing through the content item was detected, continuing scrubbing through the content item.

54. The non-transitory computer readable storage medium of claim 53, further storing instructions which, when executed by the one or more processors, further cause the electronic device to perform:

in response to receiving the input for scrubbing through the content item, and in accordance with a determination that the input was not moving when the end of the input for scrubbing through the content item was detected, ceasing the scrubbing through the content item and resuming playback of the content item from a current playback position corresponding to the end of the input for scrubbing through the content item.

55. The non-transitory computer readable storage medium of claim 53, wherein continuing the scrubbing through the content item includes changing a scrubbing rate through the content item by a predefined rate.

56. The non-transitory computer readable storage medium of claim 22, wherein the content item is displayed via the display generation component at a first location in a display area of the display generation component, and wherein the non-transitory computer readable storage medium further stores instructions which, when executed by the one or more processors, further cause the electronic device to perform:

while scrubbing through the content item:

in accordance with a determination that one or more second criteria, different from the one or more first criteria, are not satisfied, displaying the content item at the first location in the display area of the display generation component; and in accordance with a determination that the one or more second criteria are satisfied, shifting the display of the content item to a second location, different from the first location, in the display area of the display generation component.

57. The non-transitory computer readable storage medium of claim 22, wherein scrubbing through the content item in accordance with the movement in the region includes:

in accordance with a determination that a speed of the movement in the region is below a threshold speed, scrubbing through the content item on a frame-by-frame basis; and in accordance with a determination that the speed of the movement in the region is above the threshold speed, scrubbing through the content item on a plurality of frames-by-plurality of frames basis.

58. The non-transitory computer readable storage medium of claim 22, wherein scrubbing through the content item in accordance with the movement in the region includes:

in accordance with a determination that a network connection speed of the electronic device is a first speed, scrubbing through the content item at a first scrubbing rate; and in accordance with a determination that the network connection speed of the electronic device is a second speed, different from the first speed, scrubbing through the content item at a second scrubbing rate, different than the first scrubbing rate.

59. The non-transitory computer readable storage medium of claim 22, further storing instructions which, when executed by the one or more processors, further cause the electronic device to perform:

while scrubbing through the content item in accordance with the movement in the region, displaying the scrubber bar or a timeline bar corresponding to the content item that indicates a current playback position in the content item.

60. The non-transitory computer readable storage medium of claim 59, further storing instructions which, when executed by the one or more processors, further cause the electronic device to perform:

when the input for scrubbing through the content item is detected, displaying, via the display generation component, one or more playback controls that are selectable to control playback of the content item; and while scrubbing through the content item in accordance with the movement in the region, ceasing display of the one or more playback controls.

61. The non-transitory computer readable storage medium of claim 59, wherein the scrubber bar or the timeline bar is not displayed when the input for scrubbing through the content item is received.

62. The non-transitory computer readable storage medium of claim 22, wherein the input for scrubbing through the content item is received via a touch-sensitive display of the one or more input devices, and wherein scrubbing through the content item in accordance with the movement in the region includes:

in accordance with a determination that the input for scrubbing through the content item was directed to a first region of the touch-sensitive display, scrubbing through the content item with a first scrubbing rate; and in accordance with a determination that the input for scrubbing through the content item was directed to a second region, different from the first region, of the touch-sensitive display, scrubbing through the content item with a second scrubbing rate, different from the first scrubbing rate.

63. The non-transitory computer readable storage medium of claim 22, wherein the second input for scrubbing through the content item includes a first part directed to the region corresponding to the portion of the user interface that does not include the scrubber bar.

* * * * *